US007020651B2

(12) United States Patent
Ripley

(10) Patent No.: US 7,020,651 B2
(45) Date of Patent: Mar. 28, 2006

(54) SIMILARITY SEARCH ENGINE FOR USE WITH RELATIONAL DATABASES

(75) Inventor: John R. Ripley, Round Rock, TX (US)

(73) Assignee: Infoglide Software Corporation, Austin, TX (US)

( * ) Notice: Subject to any disclaimer, the term of this patent is extended or adjusted under 35 U.S.C. 154(b) by 0 days.

(21) Appl. No.: 10/969,473

(22) Filed: Oct. 20, 2004

(65) Prior Publication Data

US 2005/0055345 A1 Mar. 10, 2005

Related U.S. Application Data

(62) Division of application No. 10/365,828, filed on Feb. 13, 2003, now Pat. No. 6,829,606.

(60) Provisional application No. 60/356,812, filed on Feb. 14, 2002.

(51) Int. Cl.
*G06F 17/30* (2006.01)

(52) U.S. Cl. .................. 707/6; 707/3; 707/5; 707/10; 707/104.1; 709/219

(58) Field of Classification Search .................... 707/3, 707/4, 5, 6, 10, 100, 104.1, 103 R; 705/8, 705/10; 713/200; 715/506, 700, 716; 717/108, 717/126; 709/218, 219
See application file for complete search history.

(56) References Cited

U.S. PATENT DOCUMENTS

| 5,579,471 | A | * | 11/1996 | Barber et al. ................ 715/700 |
| 5,615,109 | A | * | 3/1997 | Eder .............................. 705/8 |
| 5,774,650 | A | * | 6/1998 | Chapman et al. ........... 713/200 |
| 5,893,095 | A | * | 4/1999 | Jain et al. ....................... 707/6 |
| 5,915,250 | A | * | 6/1999 | Jain et al. ..................... 707/100 |
| 6,038,561 | A | * | 3/2000 | Snyder et al. .................. 707/6 |
| 6,041,323 | A | * | 3/2000 | Kubota .......................... 707/5 |
| 6,070,240 | A | * | 5/2000 | Xydis ......................... 713/200 |
| 6,182,069 | B1 | * | 1/2001 | Niblack et al. ................ 707/6 |
| 6,253,187 | B1 | * | 6/2001 | Fox ............................. 705/10 |
| 6,374,237 | B1 | * | 4/2002 | Reese ............................ 707/3 |
| 6,434,568 | B1 | * | 8/2002 | Bowman-Amuah ..... 707/103 R |
| 6,442,748 | B1 | * | 8/2002 | Bowman-Amuah ......... 717/108 |
| 6,446,065 | B1 | * | 9/2002 | Nishioka et al. ............... 707/5 |
| 6,526,423 | B1 | * | 2/2003 | Zawadzki et al. .......... 715/506 |
| 6,529,909 | B1 | * | 3/2003 | Bowman-Amuah .......... 707/10 |

(Continued)

OTHER PUBLICATIONS

Petrakis, Euripides G. M. et al., "Similarity Searching in Medical Image Databases", IEEE Transaction on Knowledge and Data Engineering, vol. 9, No. 3, May/Jun. 1997, pp. 435-447.*

*Primary Examiner*—Shahid Alam
(74) *Attorney, Agent, or Firm*—Taylor Russell & Russell, P.C.

(57) ABSTRACT

The invention provides a system and method for defining a schema and sending a query to a Similarity Search Engine to determine a quantitative assessment of the similarity of attributes between an anchor record and one or more target records. The Similarity Search Engine makes a similarity assessment in a single pass through the target records having multiple relationship characteristics. The Similarity Search Engine is a server configuration that comprises a Gateway for command and response routing, a Virtual Document Manager for document generation, a Search Manager for document scoring, and an Relational Database Management System for providing data persistence, data retrieval and access to User Defined Functions. The Similarity Search Engine uses a unique command syntax based on the Extensible Markup Language to implement functions necessary for similarity searching and scoring.

14 Claims, 33 Drawing Sheets

U.S. PATENT DOCUMENTS

| | | | |
|---|---|---|---|
| 6,550,057 B1 * | 4/2003 | Bowman-Amuah | 717/126 |
| 6,618,727 B1 * | 9/2003 | Wheeler et al. | 707/10 |
| 6,691,109 B1 * | 2/2004 | Bjornson et al. | 707/4 |
| 6,745,183 B1 * | 6/2004 | Yamaguchi et al. | 707/5 |
| 6,850,252 B1 * | 2/2005 | Hoffberg | 715/716 |
| 2002/0178153 A1 * | 11/2002 | Nishioka et al. | 707/3 |

* cited by examiner

```
<RESULT>
    <DOCUMENT id="1">
       <Claim>
          <Witness>
                  <City>Jamestown</City>
          </Witness>
          <Witness>
                  <City>Alta</City>
          </Witness>
          <Witness>
                  <City>Antietam Creek</City>
          </Witness>
       </Claim>
    </DOCUMENT>
<RESULT>
```

```
<RESULT>
    <DOCUMENT schema="Sample"name="1"score="1.0"/>
    <DOCUMENT schema="Sample"name="3"score="0.82"/>
</RESULT>
```

| "MEASURE" //METHOD | DESCRIPTION |
|---|---|
| "looks_like" //string_diff() | A strongly left-to-right biased general string comparison function that returns a score of from 0.0 to 1.0. |
| "spelled_like" //CompareEditDistance() | A non-biased general string comparison function that returns a score of from 0.0 to 1.0. |
| "sounds_like" //CompareSoundex() | Finds and groups family names that are variations on a root name spelling. |
| "exact" //CompareExact() | Exact, but case-sensitive comparison with boolean-style return. |
| "near" //CompareDigitStrings() | A smart, lexical comparison of strings known to contain digits, which compensates for typographical errors by using weighting. |
| "numeric" //CompareNumeric() | A numeric comparison of strings known to contain all digits, returning a fractional score value. |
| "date" //CompareDate() | Provides a "proximity comparison of dates that returns a score of from 0.0 to 1.0. |
| "time" //CompareTime() | Provides a "proximity" comparison for times for a range of interest of less than two hours. |
| "name" //CompareNames() | Provides a tokenized comparison specifically for personal names. Last name is weighted most heavily, then first, then middle. |
| "telephone" //ComparePhoneNumbers() | Provides a tokenized comparison specifically for telephone numbers. Area code and exchange are weighted most heavily. |
| "state" //CompareStates() | Provides a smart comparison for U.S. states. Checks standard state abbreviations and maps them to their full name. |

FIG-6A

| "MEASURE" //METHOD | DESCRIPTION |
|---|---|
| "street_address" //CompareStreetAddress() | Provides a tokenized comparison specifically for street addresses. Street name weighted most heavily, then number, apartment, type. |
| "email" //CompareEmail() | Provides tokenized comparison specifically for email addresses. Name weighted most heavily, then extra, domain, high domain. |
| "url" //CompareURL() | Provides a tokenized comparison specifically for URL addresses. Domain weighted most heavily, then extra, high domain, www. |
| "ip_address" //CompareDottedIP() | Provides a tokenized comparison specifically for IP addresses. Group1 weighted most heavily, then group2, group3, group4. |
| "vin" //CompareVIN() | Provides a tokenized comparison for Vehicle ID Numbers. Group4 weighted most heavily, then group1, group2, group3. |
| "vehicle_tag" //CompareVehicleTag() | Provides a simple comparison for Vehicle Tags. |
| "federal_id_number" //CompareFIN() | Provides a simple comparison for Federal ID Numbers. |
| "credit_card" //CompareCreditCard() | Provides a simple comparison for Credit Card Numbers. |
| "drivers_license" //CompareDLnumber() | Provides a simple comparison for Drivers License Numbers. |
| "ssn" //CompareSSN() | Provides a tokenized comparison for Social Security numbers. |
| "less_than" //CompareLessThan() | Provides a boolean-type comparison for any two strings. The strings may be compared numerically or lexically. |

FIG-6B

| "MEASURE"<br>//METHOD | DESCRIPTION |
|---|---|
| "less_than_equal"<br>//CompareLessThanEqual() | Provides a boolean-type comparison for two strings. The strings may be compared numerically or lexically. |
| "greater_than"<br>//CompareGreaterThan() | Provides a boolean-type comparison for two strings. The strings may be compared numerically or lexically. |
| "greater_than_equal"<br>//CompareGreaterThanEqual() | Provides a boolean-type comparison for two strings. The strings may be compared numerically or lexically. |
| "metaphone"<br>//CompareMetaphone() | Provides groupings of differently, yet correctly spelled names. May be used to provide phonetic comparisons. |
| "phonex"<br>//ComparePhonex() | Provides phonetic comparisons. |
| "contains"<br>//ContainsString() | Provides a boolean-type test for sub-string inclusion. |
| "starts_with"<br>//BeginsWith() | Provides a boolean-type test for sub-string inclusion. |
| "ends_with"<br>//EndsWith() | Provides a boolean-type test for sub-string inclusion. |
| "pattern"<br>//ContainsPattern() | Provides a boolean-type test for sub-string inclusion. |

FIG-6C

```
<RESPONSE>
    <RESULT>
        the contents of get/setResult (if any)
    </RESULT>
    <ERROR>
        the contents of get/setError (if any)
    </ERROR>
    <WARNING>
        the contents of get/setWarning (if any)
    </WARNING>
</RESPONSE>
```

FIG-8

```
<command op="operation">
    clauses
</command>
``` where: *command* is a command name:
            DOCUMENT
            SCHEMA
            DATATYPE
            DATASOURCE
            QUERY
            MEASURE
            CHOICE
            USER
*operation* is the operation to be performed
*clauses* are the clauses defined for the command

FIG-10

```
<SCHEMA op="operation" schema="schema" lock="status">
    <STRUCTURE>
        structure
    </STRUCTURE>
    <MAPPING>
        datasets
    </MAPPING>
    <SEMANTICS>
        <APPLY>
            <PATH> xpath </PATH>
            semantics
        </APPLY>
    </SEMANTICS>
</SCHEMA>
``` where: *operation*   is one of the following operations:
- list     lists first 100 schemas in repository
- read    reads the schema from repository
- write   writes schema to repository
- delete  removes schema from repository
- lock    locks the schema
- unlock unlocks the schema

*schema*     is the name of the search schema
*status*      return to indicate status of lock request
- granted  lock successful
- denied   lock failed, schema already locked

*structure*  is the XML structure of the search terms
*datasets*   is the hierarchy of datasets providing target values
*xpath*      is the XML path leading to an element in the structure above
*semantics* is a list of elements defining measures, parsers, or choices to be used in searches of values for the specified element

FIG-12

```
<RESPONSE>
    <RESULT>
        <SCHEMA op="read" name="1"/>
        <SCHEMA op="read" name="2"/>
        <SCHEMA op="read" name="3"/>
    </RESULT>
</RESPONSE>
```

FIG-13

```
<STRUCTURE>
    <parent>
        <child/>
    </parent>
</STRUCTURE> where:  parent   is the XML tag for parent element
        child    is the XML tag for child element
```

FIG-14

```
<STRUCTURE>
    <Product>
        <Type/>
        <Model>
            <Name/>
            <Number/>
        </Model>
        <MSRP/>
        <Manufacturer/>
        <Vendor/>
    </Product>
</STRUCTURE>
```

FIG-15

```
<MAPPING implementation="Acme Software:mapping:relational">
    <DATASET datasource="datasource">
        <EXPRESSION  type="table"/>
        <PATH>xpath </PATH>
        <BIND>
                <FIELD>
                        <NAME>pkey </NAME>
                        <TYPE>dbtype </TYPE>
                </FIELD>
                <MASTER>
                        <NAME>fkey </NAME>
                        <TYPE>dbtype </TYPE>
                </MASTER>
                <DETAIL>
                        <NAME>pkey </NAME>
                        <TYPE>dbtype </TYPE>
                </DETAIL>
        </BIND>
        <FIELD>
                <PATH>xpath </PATH>

<NAME>dbfield </NAME>
                <TYPE>dbtype </TYPE>

</FIELD>
    </DATASET>
</MAPPING>
``` where: *datasource* is the name of the datasource providing data to be mapped
      *xpath*    is the XML path of the element to which this table is mapped
      *pkey*     is the database field serving as the primary key for the import
      *dbtype*   is the database data type for the associated field
      *fkey*     is the foreign key used for join to primary key of parent table, if any
      *dbfield*   is a database field mapped to elements in the xpath for the table

FIG-16

```xml
<MAPPING>
    <DATASET datasource="ProductDBConnInfo">
        <EXPRESSION type="table">Product</EXPRESSION>
        <PATH>Product</PATH>
        <BIND>
            <DETAIL>
                <NAME>Man_Model_Number</NAME>
                <TYPE>Text</TYPE>
            </DETAIL>
        </BIND>
        <FIELD pkey="true">
            <NAME>Man_Model_Number</NAME>
            <TYPE>Text</TYPE>
            <PATH>Product/Model/Number</PATH>
        </FIELD>
        <FIELD>
            <NAME>Type</NAME>
            <TYPE>Text</TYPE>
            <PATH>Product/Type</PATH>
        </FIELD>
        <FIELD>
            <NAME>MSRP</NAME>
            <TYPE>Decimal</TYPE>
            <PATH>Product/MSRP</PATH>
        </FIELD>
        <FIELD>
            <NAME>Created_On</NAME>
            <TYPE>Date</TYPE>
            <PATH>Product/@created_on</PATH>
```

FROM FIG-17A

```
        </FIELD>
        <DATASET>
                <EXPRESSION type="table">Model</EXPRESSION>
                <PATH>Product/Vendor</PATH>
                <BIND>
                        <DETAIL>
                                <NAME>Ven_Model_Number</NAME>
                                <TYPE>Text</TYPE>
                        </DETAIL>
                        <MASTER>
                                <NAME>Man_Model_Number</NAME>
                                <TYPE>Text</TYPE>
                        </MASTER>
                </BIND>
                <FIELD pkey="true">
                        <NAME>Ven_Model_Number</NAME>
                        <TYPE>Text</TYPE>
                        <PATH>Product/Vendor/Number</PATH>
                </FIELD>
                <FIELD>
                        <NAME>Name</NAME>
                        <TYPE>String</TYPE>
                        <PATH>Product/Vendor/Name</PATH>
                </FIELD>
        </DATASET>
    </DATASET>
</MAPPING>
```

FIG-17B

```
<SEMANTICS>
    <APPLY>
        <PATH>
            xpath
        </PATH>
        <MEASURE name="measure">
            measure
        </MEASURE>
        <CHOICE name="choice">
            choice
        </CHOICE>
        <WEIGHT>
            weight
        </WEIGHT>
    </APPLY>
</SEMANTICS>
``` where: *xpath*    XML path for this element
       *measure*  name of similarity measure being applied
       *choice*   selection of pairing methods: must be "global_greedy"
       *weight*   relative weight for element (scale −1.00 to 1.00)

FIG−18

```
<QUERY op="operation">
    <WHERE>
        anchor
    </WHERE>
    <FROM>
        documents
    </FROM>
    <RESTRICT>
        restrictions
    </RESTRICT>
    <SELECT score="boolean">
        structure
    </SELECT>
    <SEMANTICS>
        semantics
    </SEMANTICS>
</QUERY>
``` where: *operation*   is "execute" to run a query
      *anchor*     is an XML document structure populated with search terms
   *documents* are DOCUMENT-clause(s) indicating documents to be searched
    *structure*  is the STRUCTURE-clause for the result set produced by the query
    *boolean*   is used to request similarity scoring in <SELECT> clause
             true   return similarity scores for selected elements
             false return structure only, no scores
  *restrictions* gives one or more ways of culling result set (in order listed)
            by <SCORE> : <START>/<END> define range of scores
            by <PERCENT>: <START>/<END> define percentiles of scores
    *semantics*  one or more properties as defined for SCHEMA command

FIG-20

```
<WHERE>
    <Product>
        <Type>DVD Player</Type>
        <Model>
            <Number>A1000</Number>
        </Model>
        <Manufacturer>Acme</Manufacturer>
    </Product>
</WHERE>
```

FIG-21

```
<FROM>
    <DOCUMENT name="*"schema="acme_products"/>
</FROM>
```

FIG-22A

```
<FROM>
    <DOCUMENT schema="acme_products">
        <Product>
            <Type>DVD Player</Type>
            <Model>
                <Number>A1000</Number>
            </Model>
            <Manufacturer>Acme</Manufacturer>
        </Product>
    </DOCUMENT>
    <DOCUMENT schema="acme_products">
        <Product>
            <Type>DVD Pro</Type>
            <Model>
                <Number>A1100</Number>
            </Model>
            <Manufacturer>Acme</Manufacturer>
        </Product>
    </DOCUMENT>
    <DOCUMENT schema="acme_products">
        <Product>
            <Type>Super DVD</Type>
            <Model>
                <Number>A1200</Number>
            </Model>
            <Manufacturer>Acme</Manufacturer>
        </Product>
    </DOCUMENT>
</FROM>
```

FIG-22B

```
<RESTRICT>
    <SCORE>
        <START>score</START>
        <END>score</END>
    </SCORE>
    <INDEX>
        <START>sequence</START>
        <END>sequence</END>
    </INDEX>
</RESTRICT>
```
where: *score* is a similarity score expressed as a number in the range of 0.00 to 1.00
*sequence* is a document's place in the result set as expressed by a positive integer

FIG-23

```
<RESTRICT>
    <SCORE>
        <START>1.00</START>
        <END>0.80</END>
    </SCORE>
    <INDEX>
        <START>1</START>
        <END>3</END>
    </INDEX>
</RESTRICT>
```

FIG-24

```
<SELECT score="true">
    <Product>
        <Type/>
        <Model>
            <Number/>
            <Name/>
        </Model>
    </Product>
</SELECT>
```

FIG-25

```
<RESPONSE>
    <RESULT>
        <QUERY op="operation" name="name" schema="schema"
            <DOCUMENT score="score">
                <element>value</element>
            </DOCUMENT>
            <SCORE
                <APPLY>
                    <PATH>xpath</PATH>
                    <VALUE>score</VALUE>
                </APPLY>
            </SCORE>
        </QUERY>
    </RESULT>
    <ERROR>
        <DOCUMENT name="name" schema="schema">
            <MESSAGE>text</MESSAGE>
        </DOCUMENT>
    </ERROR>
    <WARNING>
        <DOCUMENT name="name" schema="schema">
            <MESSAGE>text</MESSAGE>
        </DOCUMENT>
    </WARNING>
</RESPONSE>
``` where: *operation*  is the operation performed
       *name*     is the unique name for the document (or "*" for all)
       *schema*  is the unique name for the search schema
       *document* is a results document
       *element*  is a reflection of the document structure
       *xpath*    is the XML path of the search term whose score is returned
       *score*    is the similarity score for the element
       *text*     is text describing the error or warning

FIG-26A

```
<RESPONSE>
    <RESULT>
        <DOCUMENT name="name"schema="schema"score="score">
            <element>value</element>
        </DOCUMENT>
    </RESULT>
</RESPONSE>
```

FIG-26B

```
<RESPONSE>
    <RESULT>
        <DETAIL name="name" schema="schema" score="score">
            <APPLY>
                <WHERE>xpath</WHERE>
                <FROM>xpath</FROM>
                <SCORE>score</SCORE>
            </APPLY>
        </DETAIL>
    </RESULT>
</RESPONSE>
```
where: name     is the unique name for the document
       schema   is the data model for the search
       element  is a reflection of the document structure
       score    is the similarity score for the element or attribute
       value    is a target value
       xpath    is the element or attribute whose score is shown

FIG-26C

```
<RESPONSE>
    <RESULT>
        <DOCUMENT score="1.00" name="1" schema="acme_products"/>
        <DOCUMENT score="0.95" name="2" schema="acme_products"/>
        <DOCUMENT score="0.90" name="3" schema="acme_products"/>
    </RESULT>
</RESPONSE>
```

FIG-27

```
<DOCUMENT op="operation" name="name" schema="schema "/>
```
where: operation  is one of the following operations:
                   list     lists contents of document directory
                   read   retrieves documents from the repository
                   lock   locks documents
                   unlock unlocks documents
       name       is the unique name for the document
       schema     is the name of a search schema for the document

FIG-28

```xml
<DOCUMENT name="1" schema="acme_products">
    <Product>
        <Type>DVD Player</Type>
        <Model>
            <Name>Super DVD</Name>
            <Number>A1000</Number>
        </Model>
        <Model>
            <Name>Super Display</Name>
            <Number>A1000</Number>
        </Model>
        <MSRP>199.00</MSRP>
        <Manufacturer>Acme</Manufacturer>
    </Product>
</DOCUMENT>
<DOCUMENT name="2" schema="acme_products">
    <Product>
        <Type>DVD Player</Type>
        <Model>
            <Name>DVD Pro</Name>
            <Number>A1010</Number>
        </Model>
        <MSRP>250.00</MSRP>
        <Manufacturer>acme.com</Manufacturer>
    </Product>
</DOCUMENT>
<DOCUMENT name="3" schema="acme_products">
    <Product>
        <Type>DVD</Type>
        <Model>
            <Name>DVD Pro</Name>
            <Number>A100<Number>
        </Model>
        <MSRP>200.00</MSRP>
        <Manufacturer>Acme.com</Manufacturer>
    </Product>
</DOCUMENT>
```

FIG-29

```
<STATISTIC name="name">
    <WHERE>
        standard where clause of an SSE query
    </WHERE>
    <SEMANTICS>
        standard semantics clause of an SSE query
    </SEMANTICS>
    <FROM>
        standard from clause of an SSE query
    </FROM>
    <SELECT>
        standard select clause of an SSE query(fields used in stats)
    </SELECT>
    <RESTRICT>
        <COUNT>
            <START>minimum value</START>
            <END>maximum</END>
        </COUNT>
    </RESTRICT>
    <TARGET>
        <TABLE>the tablename of the target stats table</TABLE>
        <SCHEMA>the schema name of the target stats
          schema</SCHEMA>
    </TARGET>
</STATISTIC>
```

FIG-30

```
<STATISTIC name="Claimant Names">
    <FROM>
        <DOCUMENT schema="CNAMES_1M"name="*"/>
    </FROM>
    <SELECT>
        <CNAMES_1M>
            <NAME_LAST/>
            <NAME_FIRST/>
            <NAME_MIDDLE/>
        </CNAMES_1M>
    </SELECT>
</STATISTIC>
```

FIG-31

```
<RESPONSE>
    <RESULT>
        <SCHEMA name="new stats schema">
            schema contents here
        </SCHEMA>
    </RESULT>
</RESPONSE>
```

```
<BATCH op="execute">
    commands
<BATCH>
where:  commands  are SSE commands listed in the order of execution.
        These must all be of the same type.
```

```
<SCHEMA name "People>
    <STRUCTURE>
        <PERSON>
            <NAME>
                <FIRST>
                <MIDDLE>
                <LAST>
            </NAME>
        </PERSON>
    </STRUCTURE>
    <MAPPING>
        <DATASET>
            <EXPRESSION> PERSONS </EXPRESSIONS>
            <PATH> PERSON </PATH>
            <FIELD>
                <NAME> FIRST </NAME>
                <TYPE> STRING </TYPE>
                <PATH> PERSON/NAME/FIRST </PATH>
            </FIELD>
            <BIND> PRIMARYKEY = PKEY </BIND>
        </DATASET>
    </MAPPING>
    <SEMANTICS>
        <APPLY>
            <PATH> PERSON/NAME/FIRST </PATH>
            <MEASURE> NAME = "looks_like" </MEASURE>
            <WEIGHT> .30 </WEIGHT>
        </APPLY>
    </SEMANTICS>
  </STRUCTURE>
</SCHEMA>
```

FIG-35

```
<QUERY>
    <WHERE>
        <PERSON>
            <NAME>
                <FIRST> JOE </FIRST>
            </NAME>
            <NAME>
                <FIRST> JOHN </FIRST>
            </NAME>
        </PERSON>
    </WHERE>
    <SEMANTICS>
        <APPLY>
            <PATH> PERSON/NAME/FIRST </PATH>
            <MEASURE> ENGLISH-NAME </MEASURE>
        </APPLY>
    </SEMANTICS>
    <FROM>
        <DOCUMENT>
            <PERSON>
                <NAME>
                    <FIRST> JOHN </FIRST>
                </NAME>
            </PERSON>
        </DOCUMENT>
    </FROM>
</QUERY>
```

FIG-37

| DATA | | | RESULT | | |
|---|---|---|---|---|---|
| PRIMARY KEY | FIRST NAME | LAST NAME | PRIMARY KEY | SINGLE | COMBINED |
| 1 | John | Smith | 1 | 0.3,0.9 | 0.7 |
| 2 | Joe | Jones | 2 | 0.9,0.3 | 0.5 |
| 3 | Fred | Adams | 3 | 0.1,0.1 | 0.1 |
| 4 | Joan | Smith | 4 | 0.3,0.9 | 0.7 |
| 5 | Frank | Baker | 5 | 0.1,0.1 | 0.1 |

FIG-38

```
<RESPONSE>
    <RESULT>
        <DOCUMENT schema="PERSON" id="1">
            <SCORE="0.8">
        </DOCUMENT>
        <DOCUMENT schema="PERSON" id="2"
            <SCORE="0.7">
        </DOCUMENT>
        <DOCUMENT>
            <PERSON>
                <NAME>
                    <FIRST> John
                    <MIDDLE> Q
                    <LAST> Smith
                </NAME>
            </PERSON>
            <PERSON>
                <NAME>
                    <FIRST> Joe
                    <MIDDLE> P
                    <LAST> Jones
                </NAME>
            </PERSON>
        </DOCUMENT>
    </RESULT>
</RESPONSE>
```

FIG-39

SIMILARITY SEARCH ENGINE FOR USE WITH RELATIONAL DATABASES

This application claims benefit of U.S. Provisional Application No. 60/356,812, filed on Feb. 14, 2002, and is a divisional application of prior application Ser. No. 10/365,828, filed on Feb. 13, 2003 Now U.S. Pat No. 6,829,606. Prior application Ser. No. 10/365,828, filed on Feb. 13, 2003 is incorporated herein by reference.

BACKGROUND

The invention relates generally to the field of search engines for use with large enterprise databases. More particularly, the present invention enables similarity search engines that, when combined with standard relational database products, gives users a powerful set of standard database tools as well as a rich collection of proprietary similarity measurement processes that enable similarity determinations between an anchor record and target database records.

Information resources that are available contain large amounts of information that may be useful only if there exists the capability to segment the information into manageable and meaningful packets. Database technology provides adequate means for identifying and exactly matching disparate data records to provide a binary output indicative of a match. However, in many cases, users wish to determine a quantitative measure of similarity between an anchor record and target database records based on a broadly defined search criteria. This is particularly true in the case where the target records may be incomplete, contain errors, or are inaccurate. It is also sometimes useful to be able to narrow the number of possibilities for producing irrelevant matches reported by database searching programs. Traditional search methods that make use of exact, partial and range retrieval paradigms do not satisfy the content-based retrieval requirements of many users. This has led to the development of similarity search engines.

Similarity search engines have been developed to satisfy the requirement for a content-based search capability that is able to provide a quantitative assessment of the similarity between an anchor record and multiple target records. The basis for many of these similarity search engines is a comparison of an anchor record band or string of data with target record bands or strings of data that are compared serially and in a sequential fashion. For example, an anchor record band may be compared with target record band #1, then target record band #2, etc., until a complete set of target record bands have been searched and a similarity score computed. The anchor record bands and each target record band contain attributes of a complete record band of a particular matter, such as an individual. For example, each record band may contain attributes comprising a named individual, address, social security number, driver's license number, and other information related to the named individual. As the anchor record band is compared with a target record band, the attributes within each record band are serially compared, such as name-name, address-address, number-number, etc. In this serial-sequential fashion, a complete set of target record bands are compared to an anchor record band to determine similarity with the anchor record band by computing similarity scores for each attribute within a record band and for each record band. Although it may be fast, there are a number of disadvantages to this "band" approach for determining a quantitative measure of similarity.

Using a "band" approach in determining similarity, if one attribute of a target record band becomes misaligned with the anchor record band, the remaining record comparisons may result in erroneous similarity scores, since each record attribute is determined relative to the previous record attribute. This becomes particularly troublesome when confronted with large enterprise databases that inevitably will produce an error, necessitating starting the scoring process anew. Another disadvantage of the "band" approach is that handling large relational databases containing multiple relationships may become quite cumbersome, slowing the scoring process. Furthermore, this approach often requires a multi-pass operation to fully process a large database. Oftentimes, these existing similarity search engines may only run under a single operating system.

There is a need for a similarity search engine that provides a system and method for determining a quantitative measure of similarity in a single pass between an anchor record and a set of multiple target records that have multiple relationship characteristics. It should be capable of operating under various operating systems in a multi-processing environment. It should have the capability to similarity search large enterprise databases without the requirement to start over again when an error is encountered.

SUMMARY

The present invention of a Similarity Search Engine (SSE) for use with relational databases is a system and method for determining a quantitative assessment of the similarity between an anchor record or document and a set of one or more target records or documents. It makes a similarity assessment in a single pass through the target records having multiple relationship characteristics. It is capable of running under various operating systems in a multi-processing environment and operates in an error-tolerant fashion with large enterprise databases.

The present invention comprises a set of robust, multi-threaded components that provide a system and method for scoring and ranking the similarity of documents that may be represented as Extensible Markup Language (XML) documents. This search engine uses a unique command syntax known as the XML Command Language (XCL). At the individual attribute level, attribute similarity is quantified as a score having a value of between 0.00 and 1.00 that results from the comparison of an anchor value attribute (search criterion) vs. a target value attribute (database field) using a distance function that identifies am attribute similarity measurement. At the document or record level, which comprises a "roll-up" or aggregation of one or more attribute similarity scores determined by a parent computing or choice algorithm, document or record similarity is a value normalized to a score value of between 0.00 and 1.00 for the document or record. A single anchor document containing multiple attributes, usually arranged in a hierarchical fashion, is compared to multiple target documents also containing multiple attributes.

The example of Table 1 illustrates the interrelationships between attributes, anchor attribute values, target attribute values, distance functions and attribute similarity scores. There is generally a single set of anchor value attributes and multiple sets of target value attributes. The distance functions represent measurement algorithms to be executed to determine an attribute similarity score. There may be token level attributes at a lowest hierarchical level as well as intermediate level attributes between the highest or parent level and the lowest or leaf level of a document or record.

Attribute similarity scores at the token level are determined by designated measurement functions to compute a token attribute similarity score of between 0.00 and 1.00. Choice or aggregation algorithms are designated to roll-up or aggregate scores in a hierarchical fashion to determine a document or record similarity score. Different weighting factors may also be used modulate the relative importance of different attribute scores. The measurement functions, weighting functions, aggregation algorithms, anchor document, and target documents are generally specified in a "schema" document. In Table 1, anchor value attributes of "John", "Austin", and "Navy" are compared with target value attributes of "Jon", "Round Rock", and "Dark Blue" using distance functions "String Difference", "GeoDistance", and "SynonymCompare" to compute attribute similarity scores of "0.75", "0.95", and "1.00", respectively.

TABLE 1

| ATTRIBUTE | ANCHOR VALUE | TARGET VALUE | DISTANCE FUNCTION | SCORE |
| --- | --- | --- | --- | --- |
| Name | John | Jon | StringDifference | 0.75 |
| City | Austin | Round Rock | GeoDistance | 0.95 |
| Shirt Color | Navy | Dark Blue | SynonymCompare | 1.00 |

In this example, all attributes are weighted equally, and the document score is determined by taking the average of similarity scores. The anchor document would compare at 0.90 vs. the target document. Although the example demonstrates the use of weighted average in determining individual scores, it is one of many possible alternatives of aggregation algorithms that may be implemented.

This Similarity Search Engine (SSE) architecture is a server configuration comprising a Gateway, a Virtual Document Manager (VDM), a Search Manager (SM) and an SQL/Relational Database Management System (RDMS). The SSE server may serve one or more clients. The Gateway provides command and response routing as well as user management functions. It accepts commands from clients and routes those commands to either the VDM or the SM. The purpose of the VDM is XML document generation, particularly schema generation. The purpose of the SM is XML document scoring, or aggregation. The VDM and the SM each receive commands from the Gateway and in turn make calls to the RDMS. The RDMS provides token attribute similarity scoring in addition to data persistence, data retrieval and access to User Defined Functions (UDFs). The UDFs include measurement algorithms for computing attribute similarity scores. The Gateway, VDM and SM are specializations of a unique generic architecture referred to as the XML Command Framework (XCF), which handles the details of threading, distribution, communication, resource management and general command handling.

There are several system objects that the SSE relies on extensively for its operation. These include a Datasource object, a Schema object, a Query object and a Measure object. A Datasource object is a logical connection to a data store, such as a relational database, and it manages the physical connection to the data store. A Schema object, central to SSE operation, is a structural definition of a document with additional markup to provide database mapping and similarity definitions. A Query object is a command that dictates which elements of a database underlying a Schema object should be searched, their search criteria, the similarity measures to be used and which results should be considered in the final output. A Measure object is a function that operates on two strings and returns a similarity score indicative of the degree of similarity between the two strings. These Measure objects are implemented as User Defined Functions (UDFs).

A method having features of the present invention for performing similarity searching comprises the steps of receiving a request instruction from a client for initiating a similarity search, generating one or more query commands from the request instruction, each query command designating an anchor document and at least one search document, executing each query command, including computing a normalized document similarity score having a value of between 0.00 and 1.00 for each search document in each query command for indicating a degree of similarity between the anchor document and each search document, and creating a result dataset containing the computed normalized document similarity scores for each search document, and sending a response including the result dataset to the client. The step of generating one or more query commands may further comprise identifying a schema document for defining structure of search terms, mapping of datasets providing target search values to relational database locations, and designating measures, choices and weight to be used in a similarity search. The step of computing a normalized document similarity score may comprise computing attribute token similarity scores having values of between 0.00 and 1.00 for the corresponding leaf nodes of the anchor document and a search document using designated measure algorithms, multiplying each token similarity score by a designated weighting factor, aggregating the token similarity scores using designated choice algorithms for determining a document similarity score having a value of between 0.00 and 1.00 for the search document. The step of computing attribute token similarity scores may further comprise computing attribute token similarity scores in a relational database management system, the step of multiplying each token similarity score may further comprise multiplying each token similarity score in a similarity search engine, and the step of aggregating the token similarity scores may further comprise aggregating the token similarity scores in the similarity search engine. The step of generating one or more query commands may comprise populating an anchor document with search criteria values, identifying documents to be searched, defining semantics for overriding parameters specified in an associated schema document, defining a structure to be used by the result dataset, and imposing restrictions on the result dataset. The step of defining semantics may comprise designating overriding measures for determining attribute token similarity scores, designating overriding choice algorithms for aggregating token similarity scores into document similarity scores, and designating overriding weights to be applied to token similarity scores. The step of imposing restrictions may be selected from the group consisting of defining a range of similarity indicia scores to be selected and defining percentiles of similarity indicia scores to be selected. The step of computing a normalized document similarity score may further comprise computing a normalized document similarity score having a value of between 0.00 and 1.00, whereby a normalized similarity indicia value of 0.00 represents no similarity matching, a value of 1.00 represents exact similarity matching, and values between 0.00 and 1.00 represent degrees of similarity matching. The step of computing attribute token similarity scores having values of between 0.00 and 1.00 may further comprise computing attribute token similarity scores having values of between 0.00 and 1.00, whereby a attribute token similarity value of 0.00 represents no similarity matching, a value of 1.00 represents exact similarity matching, and values between 0.00 and 1.00 represent degrees of similarity matching. The step of generating one or more query commands may further comprise generating one or more query commands whereby each query command includes attributes of command operation, name identification, and associated schema document identification. The method may further comprise receiving a schema instruction from a client, generating a schema command document comprising the steps of defining a structure of target search terms in one or more search documents, creating a mapping of database record locations to the target search terms, listing semantic elements for defining measures, weights and choices to be used in similarity searches, and storing the schema command document into a database management system. The method may further comprise the step of representing documents and commands as hierarchical XML documents. The step of sending a response to the client may further comprise sending a response including an error message and a warning message to the client. The step of sending a response to the client may further comprise sending a response to the client containing the result datasets, whereby each result dataset includes at least one normalized document similarity score, at least one search document name, a path to the search documents having a returned score, and at least one designated schema. The method may further comprising receiving a statistics instruction from a client, generating a statistics command from the statistics instruction, which may comprise the steps of identifying a statistics definition to be used for generating statistics, populating an anchor document with search criteria values, identifying documents to be searched, delineating semantics for overriding measures, parsers and choices defined in a semantics clause in an associated schema document, defining a structure to be used by a result dataset, imposing restrictions to be applied to the result dataset, identifying a schema to be used for the basis of generating statistics, designating a name for the target statistics table for storing results, executing the statistics command for generating a statistics schema with statistics table, mappings and measures, and storing the statistics schema in a database management system. The method may further comprise the step of executing a batch command comprising executing a plurality of commands in sequence for collecting results of several related operations. The method may further comprise selecting measure algorithms from the group consisting of name equivalents, foreign name equivalents, textual, sound coding, string difference, numeric, numbered difference, ranges, numeric combinations, range combinations, fuzzy, date oriented, date to range, date difference, and date combination. The method may further comprise selecting choice algorithms from the group consisting of single best, greedy sum, overall sum, greedy minimum, overall minimum, and overall maximum. Another embodiment of the present invention is a computer-readable medium containing instructions for controlling a computer system to implement the method above.

In an alternate embodiment of the present invention, a system for performing similarity searching comprises a gateway for receiving a request instruction from a client for initiating a similarity search, the gateway for generating one or more query commands from the request instruction, each query command designating an anchor document and at least one search document, a search manager for executing each query command, including means for computing a normalized document similarity score having a value of between 0.00 and 1.00 for each search document in each query command for indicating a degree of similarity between the anchor document and each search document, means for creating a result dataset containing the computed normalized document similarity scores for each search document, and the gateway for sending a response including the result dataset to the client. The means for computing a normalized similarity score may comprise a relational database management system for computing attribute token similarity scores having values of between 0.00 and 1.00 for the corresponding leaf nodes of the anchor document and a search document using designated measure algorithms, and the search manager for multiplying each token similarity score by a designated weighting factor and aggregating the token similarity scores using designated choice algorithms for determining a document similarity score having a value of between 0.00 and 1.00 for the search document. Each one or more query commands may further comprise a measure designation, and the database management system further comprises designated measure algorithms for computing a token similarity score. Each query command may comprise an anchor document populated with search criteria values, at least one search document, designated measure algorithms for determining token similarity scores, designated choice algorithms for aggregating token similarity scores into document similarity scores, designated weights for weighting token similarity scores, restrictions to be applied to a result dataset document, and a structure to be used by the result dataset. The computed document similarity scores may have a value of between 0.00 and 1.00, whereby a normalized similarity indicia value of 0.00 represents no similarity matching, a value of 1.00 represents exact similarity matching, and values between 0.00 and 1.00 represent degrees of similarity matching. The relational database management system may include means for computing an attribute token similarity score having a value of between 0.00 and 1.00, whereby a token similarity indicia value of 0.00 represents no similarity matching, a value of 1.00 represents exact similarity matching, and values between 0.00 and 1.00 represent degrees of similarity matching. Each query command may include attributes of command operation, name identification, and associated schema document identification for providing a mapping of search documents to database management system locations. The system may further comprise the gateway for receiving a schema instruction from a client, a virtual document manager for generating a schema command document, the schema command document comprising a structure of target search terms in one or more search documents, a mapping of database record locations to the target search terms, semantic elements for defining measures, weights, and choices for use in searches, and a relational database management system for storing the schema command document. The system of claim 18, wherein each result dataset may include at least one normalized document similarity score, at least one search document name, a path to the search documents having a returned score and at least one designated schema. Each result dataset may include an error message and a warning message to the client. The system may further comprise the gateway for receiving a statistics instruction from a client and for generating a statistics command from the statistics instruction, the search manager for identifying a statistics definition to be used for generating statistics, populating an anchor document with search criteria values, identifying documents to be searched, delineating semantics for overriding measures, weights and choices defined in a semantics clause in an associated schema document, defining a structure to be used by a result dataset, imposing restrictions to be applied to the result dataset, identifying a schema to be used for the basis of generating statistics, designating a name for the target statistics table for storing results, and a statistics processing module for executing the statistics command for generating a statistics schema with statistics table, mappings and measures, and storing the statistics schema in a database management system. The system may further comprise the gateway for receiving a batch command from a client for executing a plurality of commands in sequence for collecting results of several related operations. The system may further comprise selecting measure algorithms selected from the group consisting of name equivalents, foreign name equivalents, textual, sound coding, string difference, numeric, numbered difference, ranges, numeric combinations, range combinations, fuzzy, date oriented, date to range, date difference, and date combination. The system may further comprise choice algorithms selected from the group consisting of single best, greedy sum, overall sum, greedy minimum, overall minimum, and overall maximum.

In another embodiment of the present invention a system for performing similarity searching comprises a gateway for handling all communication between a client, a virtual document manager and a search manager, the virtual document manager connected between the gateway and a relational database management system for providing document management, the search manager connected between the gateway and the relational database management system for searching and scoring documents, and the relational database management system for providing relational data management, document and measure persistence, and similarity measure execution. The virtual document manager may include a relational database driver for mapping XML documents to relational database tables. The virtual document manager may include a statistics processing module for generating statistics based on similarity search results. The relational database management system may include means for storing and executing user defined functions. The user defined functions include measurement algorithms for determining attribute token similarity scores.

Another embodiment of the present invention is a method for performing similarity searching that comprises the steps of creating a search schema document by a virtual document manager, generating one or more query commands by a gateway, executing one or more query commands in a search manager and relational database management system for determining the degree of similarity between an anchor document and search documents, and assembling a result document containing document similarity scores of between 0.00 and 1.00. The step of creating a schema document may comprise designating a structure of search documents, datasets for mapping search document attributes to relational database locations, and semantics identifying measures for computing token attribute similarity search scores between search documents and an anchor document, weights for modulating token attribute similarity search scores, choices for aggregating token attribute similarity search scores into document similarity search scores, and paths to the search document structure attributes. The step of generating one or more query commands may comprise designating an anchor document, search or schema documents, restrictions on result sets, structure of result sets, and semantics for overriding schema document semantics including measures, weights, choices and paths. The step of executing one or more query commands may comprise computing token attribute similarity search scores having values of between 0.00 and 1.00 for each search document and an anchor document in a relational database management system using measures, and modulating the token attribute similarity search scores using weights and aggregating the token attribute similarity scores into document similarity scores having values of between 0.00 and 1.00 in the search manager using choices. The step of assembling a result document may comprise identifying associated query commands and schema documents, document structure, paths to search terms, and similarity scores by the search manager. The search schema, the query commands, the search documents, the anchor document and the result document may be represented by hierarchical XML documents. The method may further comprise selecting measure algorithms from the group consisting of name equivalents, foreign name equivalents, textual, sound coding, string difference, numeric, numbered difference, ranges, numeric combinations, range combinations, fuzzy, date oriented, date to range, date difference, and date combination. The method may further comprise selecting choice algorithms from the group consisting of single best, greedy sum, overall sum, greedy minimum, overall minimum, and overall maximum. Another embodiment of the present invention is a computer-readable medium containing instructions for controlling a computer system to implement the method above.

BRIEF DESCRIPTION OF THE DRAWINGS

These and other features, aspects and advantages of the present invention will become better understood with regard to the following description, appended claims, and accompanying drawings wherein:

FIG. 6 describes the Measures implemented as UDFs;

FIG. 8 depicts the format of a RESPONSE generated by a CommandHandler;

FIG. 10 depicts a general XCL command format;

FIG. 12 depicts the format of a SCHEMA command;

FIG. 13 depicts an example of a RESPONSE from a list of SCHEMA commands;

FIG. 14 depicts the format for a STRUCTURE clause;

FIG. 15 depicts an example of a STRUCTURE clause for a hierarchical search;

FIG. 16 depicts the format of the MAPPING clause;

FIG. 17 depicts an example of a MAPPING clause;

FIG. 18 depicts the format of the SEMANTICS clause;

FIG. 20 depicts the format of the QUERY command;

FIG. 21 depicts an example of the WHERE clause;

FIGS. 22A and 22B depict examples of a FROM clause;

FIG. 23 depicts the format of the RESTRICT clause;

FIG. 24 depicts an example of the RESTRICT clause;

FIG. 25 depicts an example of the SELECT clause;

FIGS. 26A, 26B and 26C depict formats of a RESPONSE structure;

FIG. 27 depicts an example of a RESPONSE with results of a similarity search;

FIG. 28 depicts the format of a DOCUMENT command;

FIG. 29 depicts a search document example for the layout depicted in FIG. 11;

FIG. 30 depicts a format of a statistics definition template;

FIG. 31 depicts an example of a simple statistics definition;

FIG. 35 depicts an example of a SCHEMA command;

FIG. 37 depicts an example of a QUERY command;

FIG. 38 depicts an example of a data and similarity results of a QUERY command; and FIG. 39 depicts an example RESPONSE resulting from a QUERY command.

DETAILED DESCRIPTION OF THE DRAWINGS

Figure 1:
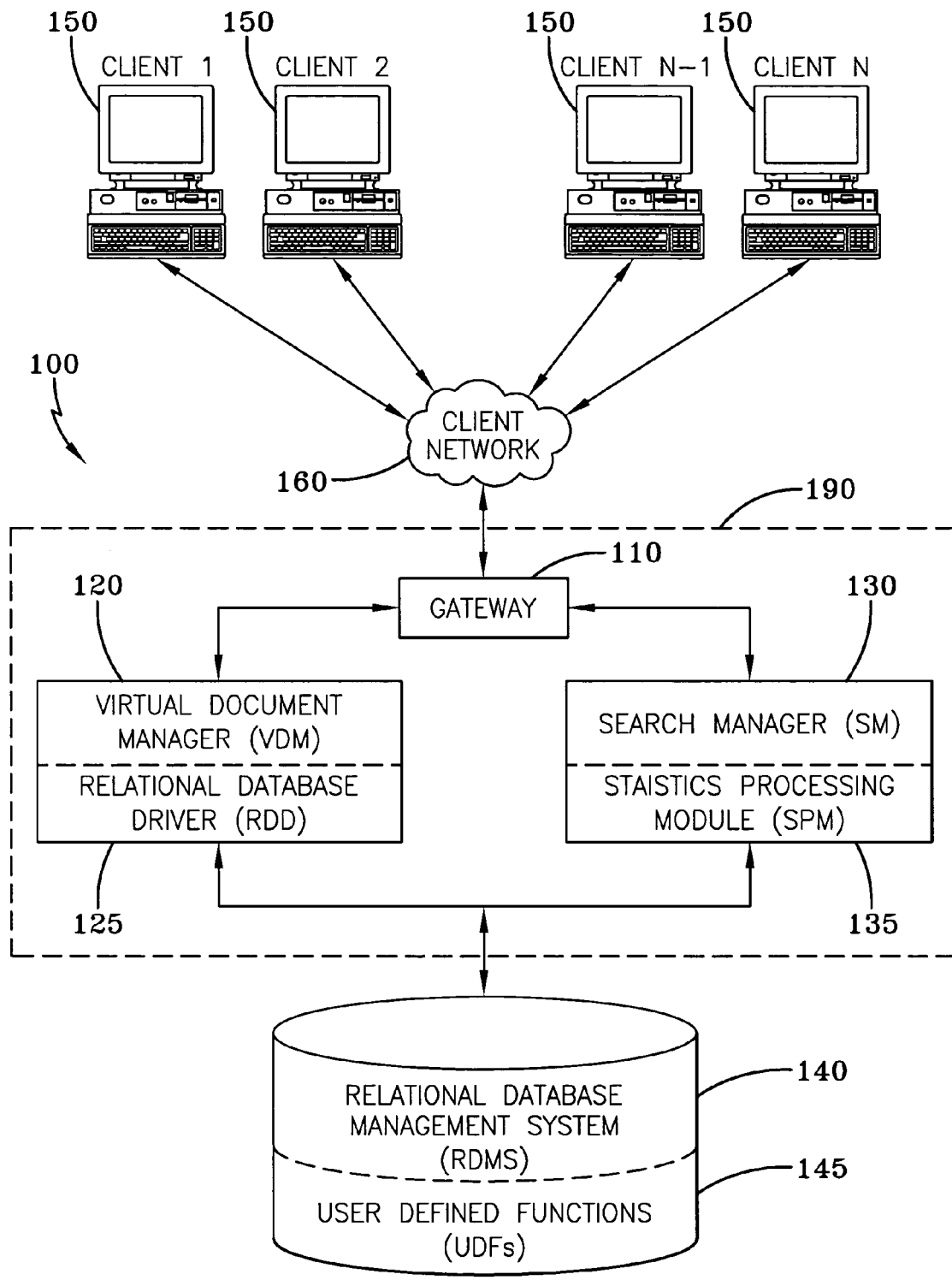
FIG. 1 depicts a high level architecture of the Similarity Search Engine (SSE)

Before describing the architecture of the Similarity Search Engine (SSE), it is useful to define and explain some of the objects used in the system. The SSE employs a command language based on XML, the Extensible Markup Language. SSE commands are issued as XML documents and search results are returned as XML documents. The specification for Extensible Markup Language (XML) 1.0 (Second Edition), W3C Recommendation 6 Oct. 2000 is incorporated herein by reference. The syntax of the SSE Command Language XCL consists of XML elements, their values and attributes that control the behavior of the SSE. Using SSE commands, a client program can define and execute searches employing the SSE.

The SSE commands are shown here in abstract syntax notation using the following conventions:

Regular type Shows command words to be entered as shown (uppercase or lowercase)

Italics Stands for a value that may vary from command to command

XML tags are enclosed in angled brackets. Indentations are used to demark parent-child relationships. Tags that have special meaning for the SSE Command Language are shown in capital letters. Specific values are shown as-is, while variables are shown in italic type. The following briefly defines XML notation:

| | |
|---|---|
| <XXX> | Tag for XML element named XXX |
| <XXX attribute="value"/> | XML element named XXX with specified value for attribute |
| <XXX>value</XXX> | XML element named XXX containing value |
| <XXX><br><YYY>value</YYY><br></XXX> | XML element named XXX containing element named YYY with the value that appears between the tags. In xpath notation, this structure would be written as XXX/YYY |

The SSE relies primarily on several system objects for its operation. Although there are other system objects, the primary four system objects include a Datasource object, a Schema object, a Query object and a Measure object.

A Datasource object describes a logical connection to a data store, such as a relational database. The Datasource object manages the physical connection to the data store. Although the SSE may support many different types of datasources, the preferred datasource used in the SSE is an SQL database, implemented by the vdm.RelationalDatasource class. A relational Datasource object is made up of attributes comprising Name, Driver, URL, Username and Password, as described in Table 2.

TABLE 2

| ATTRIBUTE | PURPOSE |
|---|---|
| Name | Within the context of an SSE, the name uniquely identifies this datasource |
| Driver | The actual class name of the JDBC driver used to connect to the relational data store |
| URL | The URL, as defined by the driver, used to locate the datasource on a network |
| Username | The username the SQL database requires for a login |
| Password | The password the SQL database requires for a login |

A Schema object is at the heart of everything the SSE does. A Schema object is a structural definition of a document along with additional markup to provide SQL database mapping and similarity definitions. The definition of a Schema object comprises Name, Structure, Mapping and Semantics, as described in Table 3.

TABLE 3

| ATTRIBUTE | PURPOSE |
|---|---|
| Name | Within the context of an SSE, the name uniquely identifies this schema |
| Structure | The structure clause of a schema defines the XML output format of documents which are built based on this schema. |
| Mapping | The mapping clause of a schema defines how each of the elements of the structure map to relational fields and tables as defined by the datasource |
| Semantics | The semantics clause of a schema defines the default similarity settings to be used when issuing a query against this schema/datasource |

A Query object is an XCL command that dictates which elements of a Schema object (actually the underlying database) should be searched, their search criteria, the similarity measures to be used and which results should be considered in the final output. The Query object format is sometimes referred to a Query By Example (QBE) because an "example" of what we are looking for is provided in the Query. Attributes of a Query object comprise a Where clause, Semantics, and Restrict, as described in Table 4.

TABLE 4

| ATTRIBUTE | PURPOSE |
|---|---|
| Where clause | The WHERE clause serves as the QBE portion of the query, this is what we are looking for. |
| Semantics | The SEMANTICS clause of a query determines how we want to search the database. This includes: similarity functions to use to compare values weights of elements in the overall score how to combine the element scores into an overall score |
| Restrict | The RESTRICT clause of a query dictates which portions of the result we are interested in. E.g. those document that score 0.80 or greater, or the top 20 documents etc.. |

A Measure object is a function that takes in two strings and returns a score (between 0.000 and 1.000) of how similar the two strings are. These Measure objects are implemented as User Defined Functions (UDFs) and are compiled into a native library in an SQL Database. Measure objects are made up of attributes comprising Name, Function and Flags, as described in Table 5.

TABLE 5

| ATTRIBUTE | PURPOSE |
|---|---|
| Name | Within the context of an SSE, the name uniquely identifies this measure |
| Function | The associated native measure implementation associated to this name. For example, a measure named "String Difference" may actually call the STDIFF( ) function |
| Flags | There are several other flags that indicated whether the function operates on character data, numeric data, date data etc. or a combination of them. |

Turning now to FIG. 1, FIG. 1 depicts a high level architecture 100 of the Similarity Search Engine (SSE). The SSE architecture 100 includes an SSE Server 190 that comprises a Gateway 110, a Virtual Document Manager (VDM) 120, a Search Manager (SM) 130 and a Relational Database Management System (RDMS) 140. The Gateway 110 provides routing and user management. The VDM 120 enables XML document generation. The SM 130 performs XML document and scoring. The RDMS 140 (generally an SQL Database) provides token attribute scoring as well as data persistence and retrieval, and storing User Defined Functions (UDFs) 145. The SSE Server 190 is a similarity search server that may connect to one or more Clients 150 via a Client Network 160. The SSE Server also connects to a RDMS 140.

The Gateway 110 serves as a central point of contact for all client communication by responding to commands sent by one or more clients 150. The Gateway 110 supports a plurality of communication protocols with a user interface, including sockets, HTTP, and JMS. The Gateway 110 is implemented as a gateway.Server class, a direct descendent of the xcf.BaseCommandServer class available in the unique generic architecture referred to as the XML Command Framework (XCF), which handles the details of threading, distribution, communication, resource management and general command handling. The XCF is discussed below in more detail. Therefore, the Gateway 110 inherits all the default command handling and communication functions available in all XCF Command Servers. The Gateway 110 relies on several types of command handlers for user definition, user login and logout, and command routing.

To add a user to the system, the Gateway 110 makes use of a user class to encapsulate what a "user" is and implements a component class interface, which is inherited from the generic XCF architecture. Instances of XCF Component command handlers used by the Gateway 110 to add, remove or read a user definition are shown in Table 6.

TABLE 6

| COMMAND HANDLER | FUNCTIONALITY |
|---|---|
| xcf.commands.ComponentAdd (gateway.commands.UserWrite) | Adds a user to the server. In order to properly create the User object to hold a user's information as opposed to a standard component, the ComponentAdd command handler is subclassed by UserWrite. |
| xcf.commands.ComponentRemove | Remove a user from the server. |
| xcf.commands.ComponentRead | Reads one or all user definitions from the server. |

When a user definition has been added to the system, a user must log in and log out of the system. Instances of command handlers used only by the Gateway 110 for user login and user logout are shown in Table 7.

TABLE 7

| COMMAND HANDLER | FUNCTIONALITY |
|---|---|
| gateway.commands.UserLogin | Retrieves username and password from USER/login XCL command and validates against list of registered users. If successful, validation is returned to requestor and user is added to list of logged in users. If not successful, an error condition is returned to requestor. |
| gateway.commands.UserLogout | Retrieves username and password from USER/logout XCL command and removes user from list of logged in users. |

The Gateway 110 includes several instances of command handlers inherited from the generic XCF architecture to properly route incoming XML Command Language (XCL) commands to an appropriate target, whether it is the VDM 120, the SM 130, or both. These command handlers used by the Gateway 110 for routing are shown in Table 8.

TABLE 8

| COMMAND HANDLER | FUNCTIONALITY |
|---|---|
| xcf.commands.SynchronizedPassthrough (SPT) | Passes an XCL command through to one or more targets, one after the other. If one of the commands passed through fails, the command handler reports the failure and terminates execution. |
| xcf.commands.Passthrough (PT) | Passes an XCL command to one target. The target must determine and report success or failure. |

Table 9 shows the routing of command types processed by the Gateway 110, and which command handler shown in Table 8 is relied upon for the command execution.

TABLE 9

| COMMAND TYPE | COMMAND OPERATION | ROUTING | COMMAND HANDLER |
|---|---|---|---|
| SCHEMA | Write, Delete | VDM, SM | SPT |
| DATASOURCE | Write, Delete | VDM, SM | SPT |
| DOCUMENT | Write, Delete | VDM, SM | SPT |
| MEASURE | All | SM | PT |
| CHOICE | All | SM | PT |
| STATISTICS | All | SM | PT |
| QUERY | All | SM | PT |
| All others | — | VDM | PT |

The communication between the Gateway 110 and the VDM 120, and between the Gateway 110 and the SM 130 is via the XML Command Language (XCL).

The VDM 120 is responsible for XML document management, and connects between the Gateway 110 and the RDMS 140. The VDM 120 is implemented by the vdm-.Server class, which is a direct descendent of the xcf.BaseCommandServer class available in the unique generic architecture referred to as the XML Command Framework (XCF), which handles the details of threading, distribution, communication, resource management and general command handling. The XCF is discussed below in more detail. Therefore, the VDM 120 inherits all the default command handling and communication functions available in all XCF Command Servers. Unlike XML databases having proprietary storage and search formats, the VDM 120 uses existing relational tables and fields to provide dynamic XML generation capabilities without storing the XML documents.

The VDM 120 provides its document management capabilities through Document Providers. The most visible function to a Client 150 of the VDM 120 is the creation and maintenance of SCHEMA documents, which define parameters used for similarity searching. A Document Provider is defined by the vdm.DocProvider interface and is responsible for generating and storing XML documents based on a schema definition. Although described embodiments of the SSE Server 190 only implement one DocProvider, which is an SQL based document provider, if the DocProvider implements the interface, the document provider can be any source that generates an XML document. For example, document providers may be file systems, web sites, proprietary file formats, or XML databases. For a user to retrieve relational data, the user must know where the data resides and how it is connected. A Datasource object encapsulates all the connection information.

There are several types of command handlers required by the VDM 120 in order to satisfactorily execute XCL commands. These include the document related command handlers shown in Table 10.

TABLE 10

| COMMAND HANDLER | FUNCTIONALITY |
| --- | --- |
| vdm.commands.DocumentRead | Builds an XML document based on a schema, its mapping, and a primary key, by assembling from records and fields. |
| vdm.commands.DocumentWrite | Writes an XML document based on a schema, its mapping, and a primary key, by disassembling into records and fields. |
| vdm.commands.DocumentDelete | Deletes an XML document based on a schema, its mapping, and a primary key, by removing relevant records. |
| vdm.commands.DocumentCount | Counts the number of unique documents for a particular schema. |
| vdm.commands.DocumentLock | Locks a document based on its schema name and primary key. Subsequent locks on this document will fail until it is unlocked. |
| vdm.commands.DocumentUnlock | Unlocks a document based on its schema name and primary key. |

Schema related command handlers required by the VDM 120 are shown in Table 11.

TABLE 11

| COMMAND HANDLER | FUNCTIONALITY |
| --- | --- |
| vdm.commands.SchemaWrite | Initializes a DocProvider based on the schema and mapping defined for the schema. |
| xcf.commands.ComponentRead | Provides a means to read a schema. |
| vdm.commands.SchemaDelete | Uninitializes a DocProvider and drops it from the list of available schemas. |

Datasource related command handlers required by the VDM 120 are shown in Table 12.

TABLE 12

| COMMAND HANDLER | FUNCTIONALITY |
| --- | --- |
| vdm.commands.DatasourceWrite | Creates and initializes the vdm.ConnectionInfo object that contains all relevant datasource information. |
| vdm.commands.DatasourceDelete | Uninitializes a datasource and removes it from the list of available datasources. |
| xcf.commands.ComponentRead | Provides a means to read a datasource. |
| vdm.commands.DatasourceMetadata | Connects to the datasource and examines all the tables, field types and lengths, indices, view defined in the datasource so that the DocProvider may make informed decisions on how to best handle the data. |

The VDM 120 communicates with the RDMS 140 via the Java Database Connectivity (JDBC) application programming interface.

The VDM 120 includes a Relational Database Driver (RDD) 125 for providing a link between XML documents and the RDMS 140. The RDD 125 implements the DocProvider interface, supporting standard functions defined in that class, including reading, writing and deleting XML documents.

The RDD 125 is initialized by calling the initialize(String map) function, where this map is an XML document describing the relationships between the XML documents to be dealt with and the relational database. For instance, consider an example XML document 210 that follows the form shown in FIG. 2. When building an XML document 210 from the RDMS 230, Datasets 220 can specify that the data in claim/claimant/name should come from the Claimants table 240 of the RDMS 230, while /claim/witness/name should come from the Witnesses table 250. Conversely, when writing an existing XML document 210 of this form out to the RDMS 230, the Datasets 220 will tell the RDD 125 that it should write any data found at /claim/claimant/name out to the "name" field of the Claimants table 240, and write the data found at /claim/witness/name out to the "name" field of the Witnesses table 250. Through describing these relationships, the Datasets 220 allows the RDD 125 to read, write, and delete XML documents for the VDM 120.

Internally, these Datasets 220 define relationships that are stored in a Java model. At the beginning of initialization, the XML map 210 is parsed and used to build a hierarchy of Datasets 220, one level of hierarchy for each database table referenced in the Datasets 220. This encapsulation of the XML parsing into this one area minimizes the impact of syntax changes in the XML map 210. These Datasets 220 have an XML form and may describe a document based on a relational table or a document based on a SQL statement. If based on a relational table, then initializing the RDD 125 with these Datasets 220 will allow full read/write functionality. However, if based on an SQL statement, then the initialized RDD 125 will allow documents to be generated from the RDMS 230, but not to be written out to it. In the common usage, in which the Dataset 220 is describing a relational table, <BIND> tags define the key fields used in the master-detail relationship. The topmost Dataset's <BIND> tag simply describes its primary key, since it has no relationship with any higher-level Dataset. Dataset <PATH> tags describe where the data being read from the tables in the RDMS 230 should be stored in the XML document 210, and visa-versa when writing XML document data to the RDMS. A Dataset <EXPRESSION> tag indicates whether the Dataset describes a document based on a relational table or a document based on an SQL statement.

The VDM 120 relies on three functions to provide the functionality of building XML documents from underlying RDMS. Each of these three functions returns the resultant document(s) as a String. The functions are singleRead, multipleRead and expressionRead.

Consider the singleRead function:
singleRead(String primaryKey, boolean createRoot, String contentFilter).

In this function, primaryKey is a String that represents the primary key of the document being produced. The boolean createRoot indicates whether or not the user wants the function to wrap the resultant XML document in a root-level <RESULT> tag. The String contentFilter is an XML structure represented as a String that describes the structure that the result must be formatted in. This structure is always a cut-down version of the full document. For instance, if we initialize the RDD 125 with an example, and then call singleRead("1", true, "<claim><witness><city/></witness></claim>"), the resulting XML document may look like that shown in FIG. 3.

Consider the expressionRead function:
expressionRead(String expression, int start, int blockSize, boolean createRoot, String contentFilter).

The expressionRead method allows the user to request a group of documents that can be described in a SQL statement. For instance, all documents whose primary key would be included in the ResultSet of "SELECT Inventory_Code FROM Products WHERE Product_Code='Clearance'." The results of executing the SQL expression, if there are any, are assumed to have the primary key included in the first column of the results. These primary keys are loaded into a Set as they are read, and the multipleRead is called with this information. In the event that the SQL expression describes too general a set of primary keys, expressionRead has two int parameters that allow a user to describe a subset of the keys returned by the SQL expression. For example, there are several hundred clearance items but only the first one hundred clearance items are of interest. To read the first one hundred clearance items, the SQL expression would be the same as above, start would be passed in as a value of 1, and blockSize would be 100. To read the second one hundred clearance items, start could be reset to 100, and blockSize would remain at its value of 100. The remaining two parameters, createRoot and contentFilter, function similarly to the way that they are described in singleRead.

Consider the multipleRead function:
multipleRead(Set primaryKeys, boolean createRoot, String contentFilter).

In multipleRead, the boolean createRoot and String ContentFilter behave just as they did in singleRead. The only parameter that is different is that instead of a single primaryKey String, multipleRead takes a set of primaryKeys. The other two read functions, singleRead and expressionRead, may be considered to be special cases of the multipleRead method. A singleRead may be considered as a multipleRead called on a primaryKey set of one. When an expressionRead is executed, the results may be fed into a set that is then sent to a multipleRead.

Composition of documents follows a basic algorithm. A row is taken from the topmost array of arrays, the one representing the master table of the document. The portion of the XML document that takes information from that row is built. Next, if there is a master-detail relationship, the detail table is dealt with. All rows associated with the master row are selected, and XML structures built from their information. In this manner, iterating through all of the table arrays, the document is built. Then, the master array advances to the next row, and the process begins again. When it finishes, all of the documents will have been built, and they are returned in String form.

The VDM relies on two functions for writing XML documents out to an underlying RDMS. These functions are singlewrite and multipleWrite. Consider the singlewrite function:
singleWrite(String primaryKey, String document).

The parameter primaryKey is the document number to be written out. The parameter document is an XML document in String form, which will be parsed and written out to the RDMS. During initialization, the driver has created a series of PreparedStatements to handle the data insertion. The driver iterates through the document, matching each leaf's context to a context in a Dataset. When a context match is made, the relevant Insert statement has another piece plugged into it. When all of the necessary data has been plugged into the prepared Insert statement, it is executed and the data is written to the RDMS.

Consider the multiplewrite function:
multipleWrite(Map documents).

The multipleWrite function takes as a parameter a Map which holds pairs of primary keys and documents. The multiplewrite function iterates through this Map, calling the singlewrite function with each of the pairs.

The VDM relies on three methods for deleting the data represented in an XML document from the underlying RDMS. The functions are singleDelete, multipleDelete and expressiondelete. Consider the singleDelete function:
singleDelete(String primaryKey, String document).

The singleDelete method takes in a String primaryKey, which identifies the document to be deleted. While the DocProvider interface requires a second parameter, the String document, the relational driver does nothing with this information and is able to function with only the document's primary key. In order to delete a given document, the driver first iterates through the Dataset structure, executing selects for relevant columns in each table. This is required to properly map the master-detail relationship. For instance, there is no guarantee that the master table's primary key will be the same key used in the detail table. Running the Dataset's selects as if a read command had been called allows the driver access to the necessary information, and insures that all components of the document are deleted. Once the selects have been executed, the driver iterates down through the Dataset executing each prepared delete statement with the proper relevant data now plugged in.

Consider the multipleDelete function:
multipleDelete(Map documents).

The multipleDelete method is bottlenecked through the singleDelete method, just as multipleWrite was through singlewrite. In this case, multiplewrite takes as a parameter a Map of paired primary keys and documents. The key set of primary keys is iterated through, and singleDelete is called on each one.

Consider the expressionDelete function:
expressionDelete(String expression).

The expressionDelete method takes as its sole parameter a SQL expression which describes the set of primary keys of documents which the user wishes to delete. The expression is executed, with the assumption that the first column of the resulting rows will be the primary key. These primary keys are iterated through, each being loaded into a call to singleDelete.

The SM 130 is responsible for XML document and SQL searching and scoring, and connects between the Gateway 110 and the RDMS 140. The SM 130 is implemented as a search.Server class, which is a direct descendent of the xcf.BaseCommandServer class available in the unique generic architecture referred to as the XML Command Framework (XCF), which handles the details of threading, distribution, communication, resource management and general command handling. The XCF is discussed below in more detail. Therefore, the SM 130 inherits all the default command handling and communication functions available in all XCF Command Servers. The SM 130 does not maintain any of its own indexes, but uses a combination of relational indexes and User Defined Functions (UDFs) 145 to provide similarity-scoring methods in addition to traditional search techniques. The SM 130 sends commands to the RDMS 140 to cause the RDMS 140 to execute token attribute similarity scoring based on selected UDFs. The SM 140 also performs aggregation of token attribute scores from the RDMS 140 to determine document or record similarity scores using selected choice algorithms. SQL commands sent by the SM 130 to the RDMS 140 are used execute functions within the RDMS 140 and to register UDFs 145 with the RDMS 140.

There are several types of command handlers required by the SM 130 in order to satisfactorily execute XCL commands. These include schema, datasource, measure (UDF), and choice related command handlers. The schema related command handlers are shown in Table 13.

TABLE 13

| COMMAND HANDLER | FUNCTIONALITY |
|---|---|
| search.commands.SchemaWrite | Stores a simple XML version of a schema. |
| xcf.commands.ComponentRead | The default component reader provides a means to read a schema. |
| vdm.commands.ComponentRemove | The default component deleter provides a means to delete a schema. |

Datasource related command handlers required by the SM 130 are shown in Table 14.

TABLE 14

| COMMAND HANDLER | FUNCTIONALITY |
|---|---|
| search.commands.DatasourceWrite | Creates and initializes the vdm.ConnectionInfo object that contains all relevant datasource connection information. |
| vdm.commands.ComponentRemove | The default component deleter provides a means to delete a datasource. |
| xcf.commands.ComponentRead | The default component reader provides a means to read a datasource. |

Measure (UDF) related command handlers required by the SM 130 are shown in Table 15.

TABLE 15

| COMMAND HANDLER | FUNCTIONALITY |
|---|---|
| search.commands.MeasureWrite | Stores an XML version of a measure |
| xcf.commands.ComponentRead | The default component reader provides a means to read a measure. |
| vdm.commands.ComponentRemove | The default component deleter provides a means to delete a measure. |

Choice related command handlers required by the SM 130 are shown in Table 16.

TABLE 16

| COMMAND HANDLER | FUNCTIONALITY |
|---|---|
| search.commands.ChoiceWrite | Stores an XML version of a choice. |
| xcf.commands.ComponentRead | The default component reader provides a means to read a choice. |
| vdm.commands.ComponentRemove | The default component deleter provides a means to delete a choice. |

The SM 130 communicates with the RDMS 140 via the Java Database Connectivity (JDBC) application programming interface.

A similarity search is generally initiated when the Gateway 110 receives a QUERY command containing a search request from a Client 150, and the Gateway 110 routes the QUERY command to the SM 130. The SM 130 generally executes the QUERY command by accessing a SCHEMA previously defined by a Client 150 and specified in the QUERY command, and parsing the QUERY command into a string of SQL statements. These SQL statements are sent to the RDMS 140 where they are executed to perform a similarity search of token attributes and scoring of the attributes of the target documents specified in the SCHEMA and stored in the RDMS 140. The attribute similarity scores are then returned to the SM 130 from the RDMS 140 where weighting factors specified in the SCHEMA are applied to each score and Choice algorithms specified in the SCHEMA aggregate or "roll-up" the attribute scores to obtain an overall similarity score for each target document or record specified in the SCHEMA or QUERY command. The scores are then returned to the Gateway 110 by the SM 130 in a RESULT document, which is then returned to the Client 150.

As an example of attribute scoring by the SM 130, consider the following SQL statement sent by the SM 130 to the RDMS 140:

SELECT CUSTOMER.ID,STRDIFF(CUSTOMER.FIRST_NAME, 'JOHN') AS S1 FROM CUSTOMER

The measure "looks_like" is implemented by the User Defined Function (UDF) STRDIFF, which takes in two varchars (string) and returns a float(0.0 . . . 1.0). In this case, the two strings are a field value (target) and literal value (search). The result of the UDF is a float (score) of the comparison. Table 17 shows an example result of this SQL statement that is returned by the RDMS 140 to the SM 130.

TABLE 17

| CUSTOMER ID | SIMILARITY SCORE - FIRST NAME |
|---|---|
| 1 | 1.0 |
| 2 | 0.0 |
| 3 | 0.75 |
| 4 | 0.50 |

Taking this example further, with more attributes, we could score more data with the SQL statement sent to the RDMS 140 by the SM 130:

SELECT CUSTOMER.ID,STRDIFF(CUSTOMER.FIRST_NAME, 'JOHN') AS S1,
STRDIFF(CUSTOMER.MIDDLE_NAME, 'R') AS S2,
STRDIFF(CUSTOMER.SURNAME, 'RIPLEY') AS S3
FROM CUSTOMER

Table 18 shows an example result of this SQL statement received by the SM 130 from the RDMS 140.

TABLE 18

| | SIMILARITY SCORE | | |
|---|---|---|---|
| CUSTOMER ID | FIRST NAME | MIDDLE NAME | LAST NAME |
| 1 | 1.0 | 1.0 | 1.0 |
| 2 | 0.0 | 0.0 | 0.0 |
| 3 | 0.75 | 1.0 | 0.72 |
| 4 | 0.50 | 0 | 0.1 |

The SM 130 has caused the RDMS 140 to score a series of attributes independently and the RDMS 140 has returned a set of scores shown in Table 18 to the SM 130.

In addition to this behavior, we can selectively limit the documents returned/examined by applying restriction logic to the search. Consider the SQL statement sent by the SM 130 to the RDMS 140:

SELECT CUSTOMER.ID,STRDIFF(CUSTOMER.FIRST_NAME, 'JOHN') AS S1,
STRDIFF(CUSTOMER.MIDDLE_NAME, 'R') AS S2,
STRDIFF(CUSTOMER.SURNAME, 'RIPLEY') AS S3
FROM CUSTOMER WHERE
STRDIFF(CUSTOMER.FIRST_NAME, 'JOHN')$\geq$0.72

In this example, only customers with a first name having a high degree of similarity ($\geq$0.72) to "John" are of interest, regardless of the other criteria (where 0.00 represents no similarity and 1.00 represents an exact similarity or comparison match). Table 19 shows the expected result received from the RDMS 140 by the SM 130.

TABLE 19

| | SIMILARITY SCORE | | |
|---|---|---|---|
| CUSTOMER ID | FIRST NAME | MIDDLE NAME | LAST NAME |
| 1 | 1.0 | 1.0 | 1.0 |
| 3 | 0.75 | 1.0 | 0.72 |

Records 2 & 4 are excluded because of their low similarity scores of first names (0.00 and 0.50, respectively) vs. "John".

Figures 2, 3, 4:
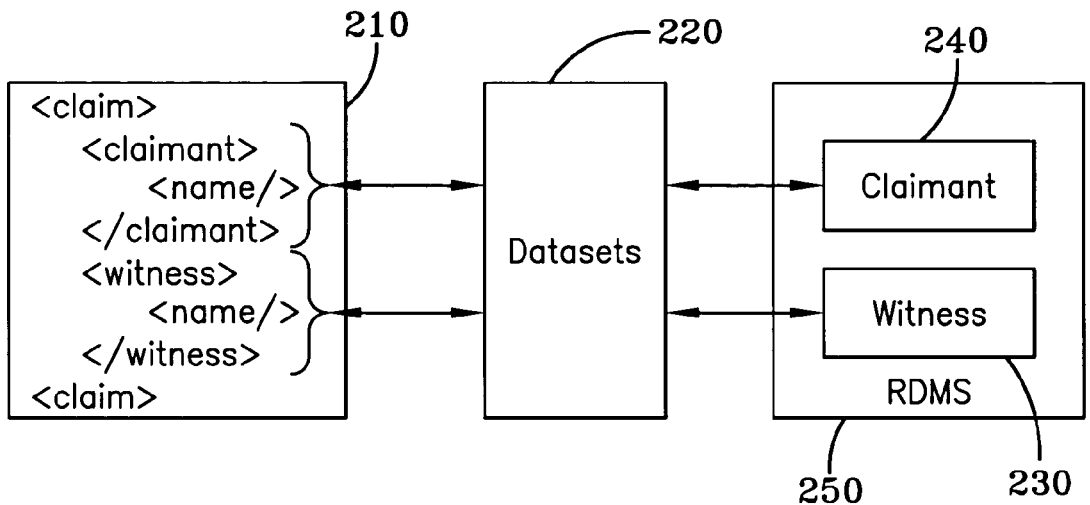
FIG. 2 depicts an example of mapping an XML document into database tables.
FIG. 3 depicts an example of an XML document resulting from a single READ.
FIG. 4 depicts an example of a RESULT from a QUERY.

Once a set of attribute scores is returned from the RDMS 140, the SM 130 determines the overall score of a record (or document) by aggregation through use of a Choice algorithm specified in the associated SCHEMA. An example of aggregation may be simple averaging the scores of the attribute after first multiplying them by relative weight factors, as specified in a QUERY command. In the example case, all fields are weighted evenly (1.00), and therefore the score is a simple average. FIG. 4 depicts an example of a RESULT document from the example of Table 19.

The Statistics Processing Module (SPM) 135 enables the acquisition of statistical information about the data stored in search tables in the RDMS 140, using the built-in functions available in the RDMS 140. This enables the definition of statistics after search data has been stored in the RDMS 140. The Statistics Processing Module (SPM) 135 gives the user the ability to specify the fields upon which they wish to obtain statistics. The list of fields selected will act as a combination when computing occurrences. For example, the most frequently occurring first, middle, and last name combination. In addition to the fields, the user will be able to provide count restriction (e.g., only those with 4 or more occurrences) along with data restriction (e.g., only those records in Texas).

Figure 5A:
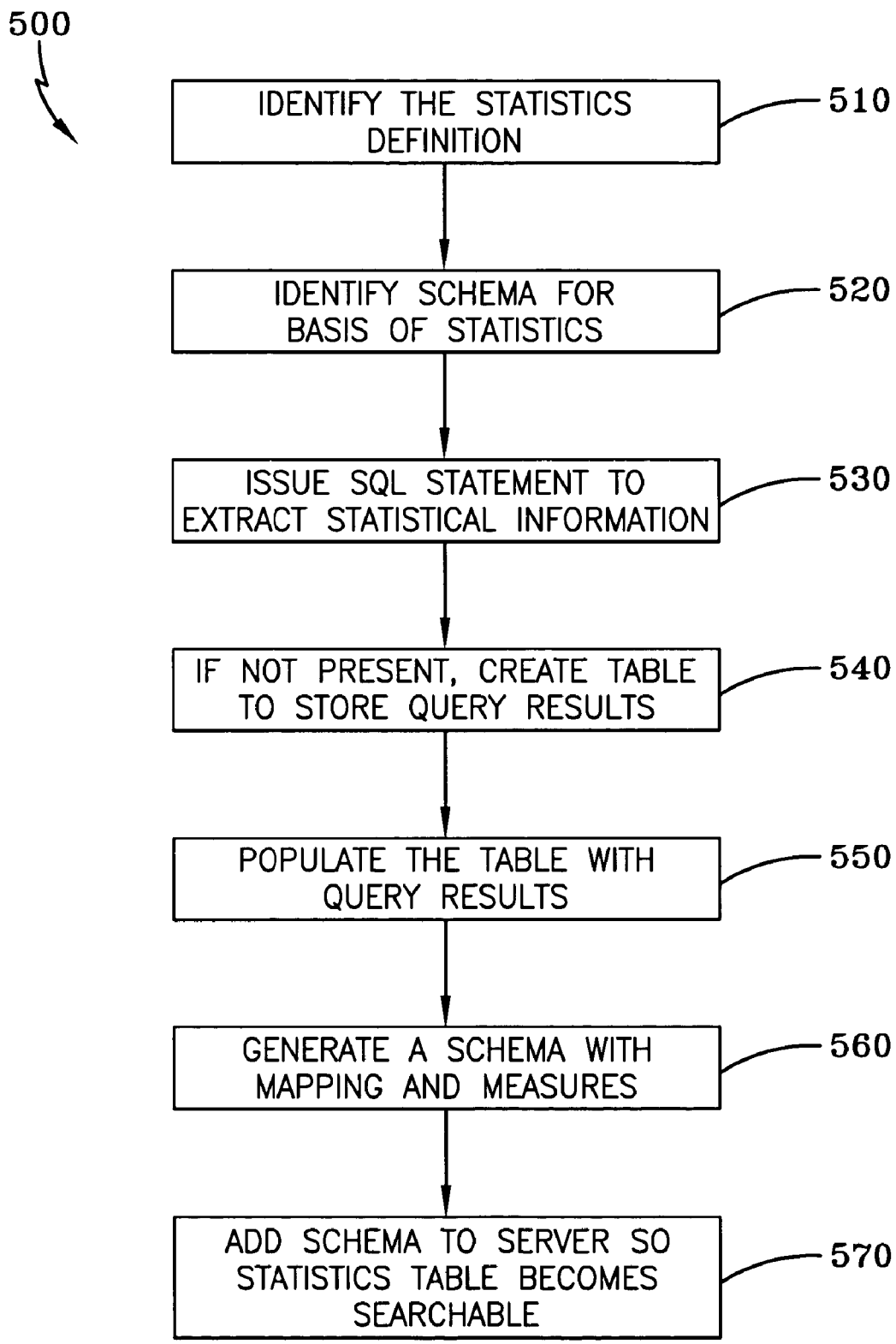
FIG. 5A depicts a process for handling a statistics command in a Search Manager (SM)
Figure 5B:
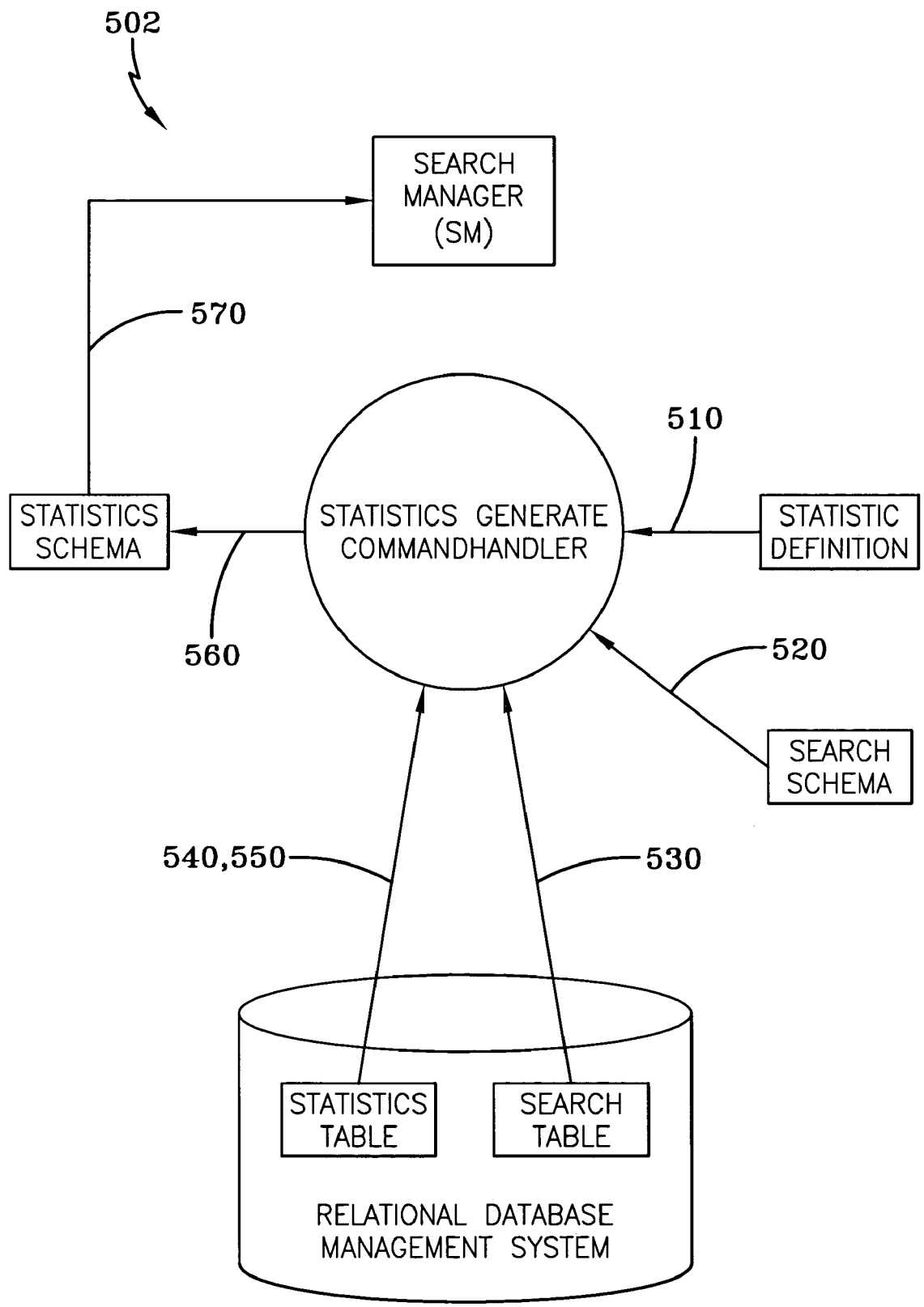
FIG. 5B depicts a dataflow of a statistics command process in a Search Manager (SM)

Turning now to FIG. 5A, FIG. 5A depicts a process 500 for handling a STATISTICS command in a Search Manager (SM) 130 when the SSE Server 190 receives a STATISTICS command and a CommandHandler is invoked to handle the process. When the SM 130 receives a STATISTICS command, the Statistics Definition to be used in the generation process is identified 510. The SCHEMA (search table) from which these statistics are based is then identified 520. Next, an SQL statement is issued to extract the necessary statistical information from the SCHEMA 530. If the results of a QUERY command are not already present, a new statistics table is created to store the results of a QUERY command 540. The statistics table is then populated with the results of the QUERY command 550. A statistics SCHEMA (with mapping and measures) is generated 560. And lastly, the newly created statistics SCHEMA is added to the SM 130 so that the statistics table becomes a new search table and is exposed to the client as a searchable database 570. FIG. 5B depicts the dataflow 502 in the statistics command process of FIG. 5B.

Statistic Definitions are considered Components that fit into the ComponentManager architecture with their persistence directory being "statistics", as described below with regard to the CommandServer of the XCF. The management commands are handled by the ComponentAdd, ComponentRemove and ComponentRead CommandHandlers available in the CommandServers registered CommandHandlers.

Turning back to FIG. 1, the RDMS 140 is generally considered to be an SQL database, although it is not limited to this type of database. In one embodiment of the present invention, the RDMS 140 may comprise a DB2 Relational Database Management System by IBM Corporation. The SM 130 communicates with the RDMS 140 by sending commands and receiving data across a JDBC application programming interface (API). The SM 130 is able to cause the RDMS 140 to execute conventional RDBMS commands as well as commands to execute the User Defined Functions (UDFs) 145 contained in a library in the RDMS 140 for providing similarity-scoring methods in addition to traditional search techniques. The VDM 120 also communicates with the RDMS 140 via a JDBC application programming interface (API).

UDFs 145 provide an extension to a Relational Database Management System (RDMS) suite of built-in functions. The built-in functions include a series of math, string, and date functions. However, none of these built-in functions generally provide any similarity or distance functional capability needed for similarity searching. The UDFs 145 may be downloaded into the RDMS 140 by the SSE server 190 provide the functions required for similarity searching. UDFs 145 may be written in C, C++, Java, or a database-specific procedure language. The implementations of these UDFs 145 are known as Measures. The Measures compare two strings of document attributes and generate a score that is normalized to a value between 0.00 and 1.00. They can be called from any application that has knowledge of the signature of the function, for example, parameters, type, and return type. For a RDMS 140 to be capable of calling UDFs 145, the function signatures must match what the database expects a UDF 145 to be, and the function library and entry point must be declared to the RDMS 140. The library of functions are compiled and deployed into the UDF library directory of the host RDMS 140, and the UDFs 145 are registered with the RDMS 140 by an SQL command. The measures are described below in more detail.

Turning now to FIG. 6, FIG. 6 describes the Measures implemented as UDFs 145 in an embodiment of the SSE. The term "tokenized Compare" is used in the Measure descriptions of FIG. 6. In the present context, it means to use domain-specific (and thus domain-limited) knowledge to break the input strings into their constituent parts. For example, an attribute of a street address can be broken down into tokens comprising Number, Street Name, Street Type, and, optionally, Apartment. This may improve the quality of scoring by allowing different weights for different tokens, and by allowing different, more specific measures to be used on each token.

Figure 7:
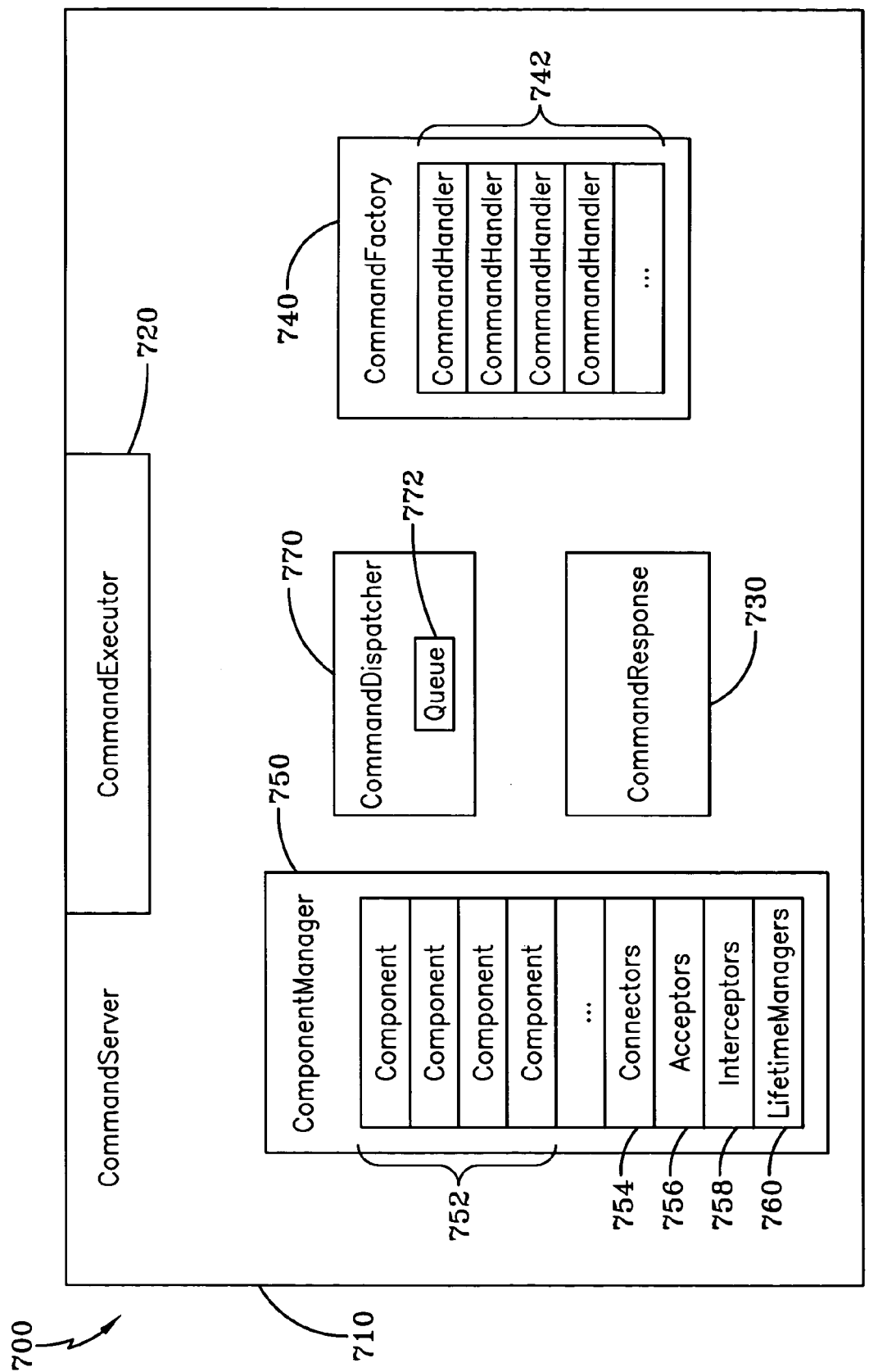
FIG. 7 depicts an architecture of the XML Command Framework (XCF)

Turning now to FIG. 7, FIG. 7 depicts an architecture of the XML Command Framework (XCF) 700. The Gateway, VDM and SM described above each rely on the flexible design of the XCF 700 for core processing capability. The XCF 700 functions as XML in and XML out, that is, it generates an XML response to an XML command. It is based upon a unique XML command language XCL that strongly focuses on the needs of search applications. The details of XCL are described below. The architecture of the XCF 700 comprises the following major entities: CommandServer 710 for configuration, overall flow, and central point of contact; CommandExecutor 720 for executing XML commands and providing XML result; CommandResponse 730 for receiving XML results; CommandHandlerFactory 740 for registration and identification of CommandHandlers 742; Component Manager 750 for management of Components 752, Acceptors 756 and Connectors 754, Interceptors 758, and LifetimeManagers 760; and CommandDispatcher 770 containing a Queue 772 for CommandHandler 742 thread management. CommandHandlers 742 process individual XML commands. Components 752 are pluggable units of functionality. Connectors 754 and Acceptors 756 provide for communication into and out of the CommandServer 710. Interceptors 758 hook to intercept incoming commands. LifetimeManagers 760 manage lifetime of CommandHandler 742 execution. Each of these entities is defined as an interface that allow for multiple implementations of an entity. Each interface is an object that has at least one base implementation defined in XCF. Each interface is limited to the contract imposed by the interface.

The CommandServer 700 is the central point-of-contact for all things in the XCF. It is responsible for overall execution flow and provides central access to services and components of the system. Most objects that reference the XCF services are passed a CommandServer reference in a constructor or in a setter method. Central access to synchronization objects can be placed here, as all supporting objects will have access. Being the central point of most things, it is also responsible for bootstrapping, initialization and configuration.

The interface to the CommandExecutor 720 is defined as:
  void execute(String command, CommandResponse response), where command is the XML command to be executed by a CommandHandler 742, and CommandResponse is any object that implements the interface to the CommandResponse 730. It is this object that will be called asynchronously when the command has been completed.

The CommandResponse interface 730 must be implemented when calling a CommandExecutor 720 execute method. The contract is:
  void setValue(String value).

Once a command has been completed, it will call this method. It is here where a particular CommandResponse 730 implementation will get a response value and process it accordingly.

The CommandHandlers 742 provide means for interpreting and executing XML commands for solving a particular problem. For each problem that needs a solution, there is an assigned CommandHandler 742. First, consider a standard XML command:
  <TYPE op="action" version="version"/>

A CommandHandler 742 is uniquely identified in the system by the three attributes shown in Table 20. These attributes are known as the signature of the CommandHandler 742.

TABLE 20

| ATTRIBUTE | DESCRIPTION |
| --- | --- |
| Type | This is the name by which common commands are grouped. It is analogous to a noun representing an object. There are many types of CommandHandlers, including DATASOURCE, SCHEMA, DOCUMENT, etc. They are shown above in Table 4. |

TABLE 20-continued

| ATTRIBUTE | DESCRIPTION |
| --- | --- |
| Action | This is the action or operation that is to be performed on this object. This is analogous to a verb. Examples include READ, WRITE, DELETE, EXECUTE, etc. |
| Version | This indicates the version of the command that this CommandHandler is expecting. For example, there could be multiple DOCUMENT/READs registered, each with its own version. As the XML Command Language (XCL) evolves, the version allows maintaining of backward compatibility for old syntaxes while enabling the addition of new CommandHandlers in different versions for supporting new syntaxes. |

The command handlers 742 provide template methods for the following functions:
1) ensure proper initialization of the CommandHandler 742;
2) register the CommandHandler 742 with the LifeTimeManager 760;
3) catch any uncaught exceptions; and
4) ensure proper uninitialization of the CommandHandler 742.

FIG. 8 depicts the format of a RESPONSE generated by a CommandHandler 742.

There are several standard CommandHandlers 742 that are responsible for overall management of the CommandServer 710. These are shown in Table 21 along with the CommandHandler PassThrough, which is not automatically registered.

TABLE 21

| COMMANDHANDLERS | DESCRIPTION |
| --- | --- |
| ComponentAdd | Serves as a general-purpose handler to add new components to the system. It is a template for ensuring components are configured, activated and added properly. The BaseCommandServer makes use of this CommandHandler 742 for CONNECTORS, ACCEPTORS and INTERCEPTORS. |
| ComponentRemove | Serves as a general-purpose handler to remove existing components from the system and ensuring they are deactivated correctly. This CommandHandler 742 is used for CONNECTORS, ACCEPTORS and INTERCEPTORS. |
| ComponentRead, ComponentList | Dedicated to return component configuration information. ComponentRead returns a configuration for a particular item or items, whereas ComponentList only returns the names of the items. |
| CommandStatus, CommandCancel | These CommandHandlers 742 handle command status and command cancellation. |
| SystemCleanup | This CommandHandler 742 calls a garbage collector. |
| DoNothing | This is a utility handler that makes sure the system can respond to commands. |
| BatchExecute | This handler is a general-purpose wrapper for executing sub-commands nested in a BATCH op = "execute" command. |
| PassThrough | If a command will not be handled by one CommandServer 710, this CommandHandler 742 can be registered to pass the command to a CommandConnector for passage to another CommandServer 710. |

The CommandHandlerFactory 740 serves as a factory for CommandHandlers 742. There is only one instance of this object per CommandServer 710. This object is responsible for the following functions:
1) registering/unregistering CommandHandlers;
2) parsing incoming XML commands;
3) identifying registered CommandHandlers responsible for handling XML commands;
4) cloning a particular CommandHandler; and
5) giving a cloned CommandHandler run-time state information.

A Component 752 is identified by its type and name. The type enables grouping of Components 752 and name uniquely identifies Components 752 within the group. The Component 752 is responsible for determining its name, and ComponentManager 750 handles grouping on type. The lifecycle of a component 752 is:
1) create a Component 752;
2) configure the Component 752, specified in XML;
3) activate the Component 752;
4) add the Component 752 to the ComponentManager 750;
5) . . .
6) remove the Component 752 from the ComponentManager 750; and
7) deactivate the Component 752.

A Component 752 is generally created, activated and added to the ComponentManager 750 at CommandServer 710 startup, and is removed and deactivated at CommandServer 710 shutdown. However, this procedure is not enforced and Components 752 can be added and removed at any time during the lifetime of a CommandServer 710.

Since the Component interface is very flexible and lightweight, many system objects are defined as Components 752. These include CommandAcceptors 756, CommandConnectors 754, CommandInterceptors 758, and LifetimeManager 760. If a Component 752 does not perform any function, but is simply a definition, a generic utility Component 752 implementation may be used. This utility only ensures that the configuration of the Component 752 is valid XML and it has a name="xxx" at the root level.

The CommandDispatcher 770 exposes a single method for InterruptedException. The CommandDispatcher interface 770 differs from the CommandExecutor 720 because it expects an initialized CommandHandler 742 rather than an XML string, and it delegates the command response functionality to the CommandHandler 742 itself. Internally, the BaseCommandDispatcher uses a PooledExecutor. As a command is added, it is placed in this bounded pool and when a thread becomes available, the CommandHandler's run( ) method is called.

The function of the LifetimeManager 760 is to keep track of any objects that requires or requests lifetime management. A LifetimeManager 760 is an optional part of a CommandServer 710 and is not explicitly listed in the CommandServer interface 710. It can be registered as a separate Component 752, and can manage anything that implements the LifetimeManager interface 760. The only objects that require Lifetime management are CommandHandlers 742. During its setup, the BaseCommandServer creates a CommandLifetimeManager component that is dedicated to this task of managing the lifetime of commands/CommandHandlers 742 that enter the system. CommandHandlers themselves do not implement the Lifetime Manager interface 760.

CommandInterceptors 758 are components that can be added to a CommandServer 710. Their function is to intercept commands before they are executed. Implementations of CommandInterceptor 758 should raise a CommandInterceptionException if evaluation fails. BaseCommandServer 710 will evaluate all registered Interceptors 758 before calling the dispatcher. If one fails, the dispatcher will not be called and the CommandInterceptorException's getMessage( ) will be placed in the error block of the response.

The Acceptor 756 and Connector 754 pair is an abstraction of the communication between clients and CommandServers 710, and between a CommandServers 710 and other CommandServers 710. CommandAcceptors 756 and CommandConnectors 754 extend the Component interface 752, and are therefore seen by the CommandServer 710 as Components 752 that are initialized, configured, activated and deactivated similar to all other Components 752. The ComponentManager 750 manages acceptors 756 and Connectors 754.

A CommandAcceptor 756 is an interface that defines how commands are accepted into a CommandServer 710. It is the responsibility of the CommandAcceptor 756 to encapsulate all the communication logic necessary to receive commands. It passes those commands (in string form) to the CommandServer 710 via its CommandExecutor interface 720. Once a command is successfully executed, it is the responsibility of the CommandAcceptor 756 to pass the result back across the communication channel.

Similar to the CommandAcceptor 756, the CommandConnector 754 encapsulates all the communication logic necessary for moving commands across a "wire", but in the case of a Connector 754, it is responsible for sending commands, as opposed to receiving commands. It is a client's connection point to a CommandServer 710. For every CommandAcceptor implementation 756, there is generally a CommandConnector implementation 754. The CommandConnector interface 754 extends the CommandExecutor interface 720, thereby implying that it executes commands. This enables location transparency as both CommandServer 710 and CommandConnector 754 expose the CommandExecutor interface 720.

As discussed, CommandAcceptors 756 and CommandConnectors 754 are Components 752 that are managed by a CommandServer's ComponentManager 750. The Acceptors 756 and Connectors 754 are the clients' view of the CommandServer 710. Several implementations of Acceptor/Connector interfaces provide most communication needs. These classes are shown in Table 22.

TABLE 22

| PROTOCOL | ACCEPTOR | CONNECTOR |
| --- | --- | --- |
| Sockets | raw.RawAcceptor | raw.RawConnector |
| HTTP | http.HTTPAcceptor | http.HTTPConnector |
| JMS | jms.JMSAcceptor | jms.JMSConnector |

All Connectors 754 are asynchronous to a user, even if internally they make use of threads and socket pools to provide an illusion of asynchronous communication.

Figure 9A:
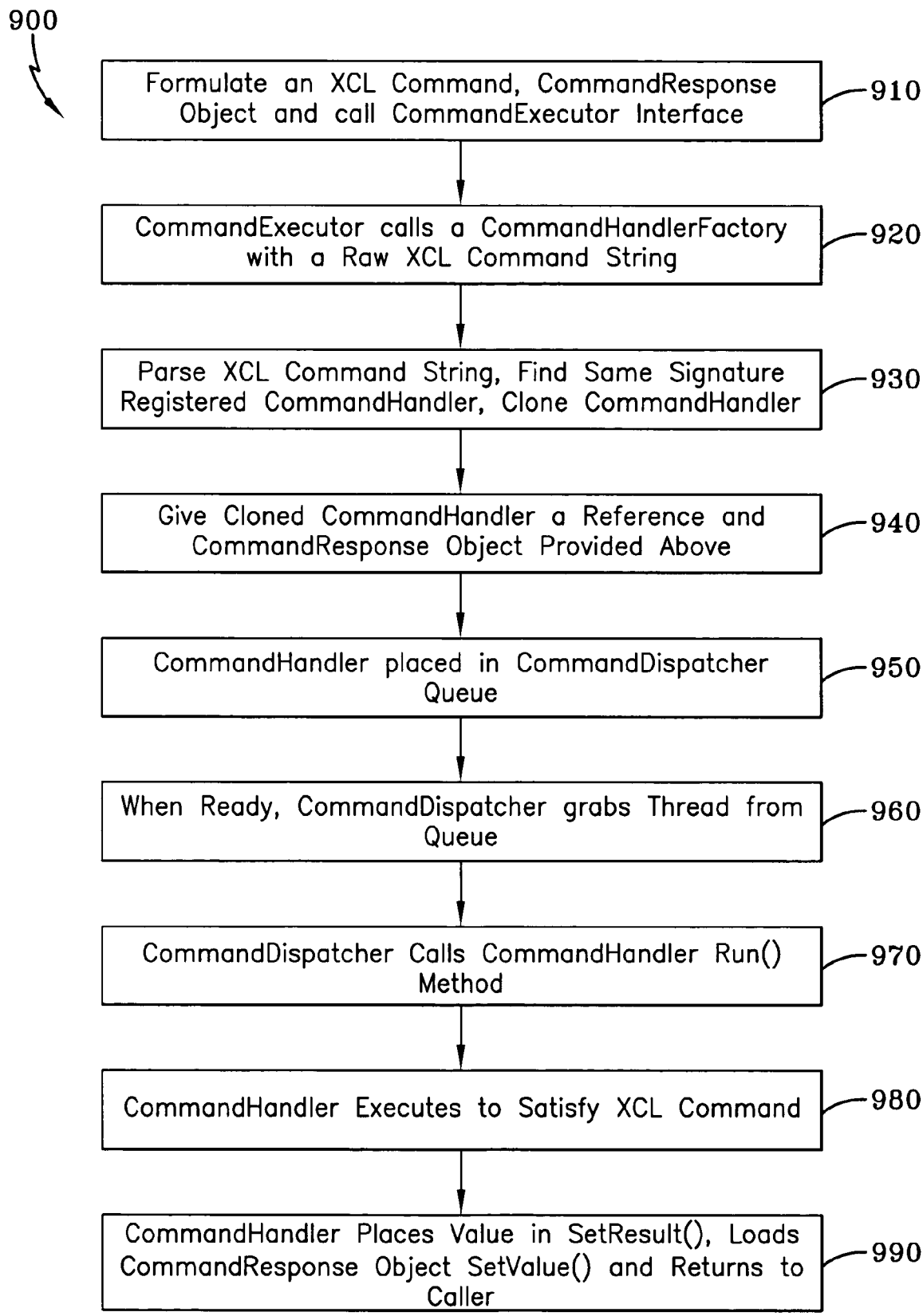
FIG. 9A depicts a process for handling an XCL command in a CommandServer.
Figure 9B:
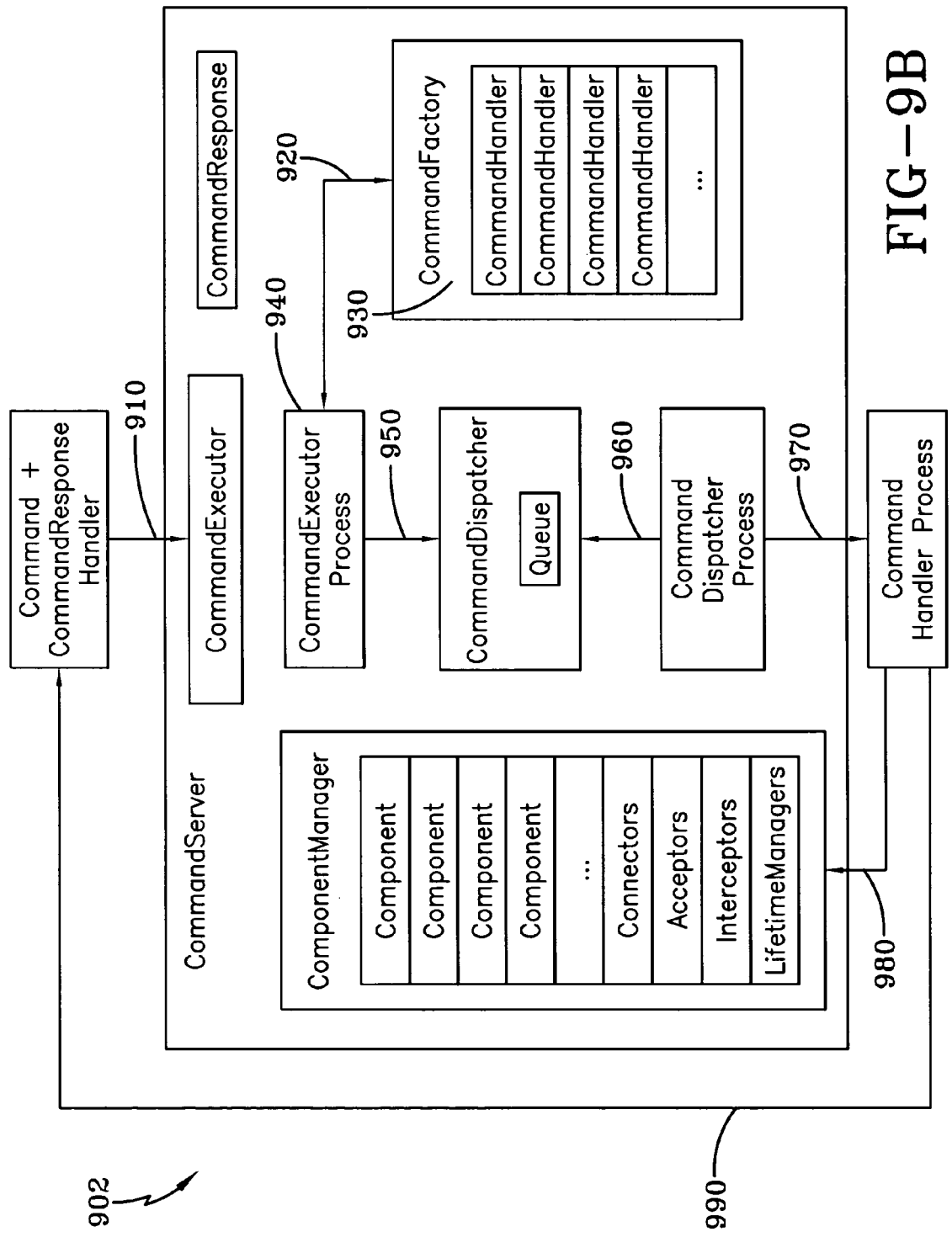
FIG. 9B depicts a dataflow of an XCL command process in a CommandServer.

Turning now to FIG. 9, FIG. 9A depicts a process 900 for handling an XCL command in a CommandServer 710. An XCL command is formulated, a CommandResponse object is provided, and a CommandServer's CommandExecutor interface is called 910. Inside the CommandServer 710, the CommandExecutor 720 calls a CommandHandlerFactory 740 with a raw XCL command string 920. Inside the CommandHandlerFactory 740, the XCL command string is parsed, a registered CommandHandler 742 is found with the same TYPE, action and version signature as the XCL command, a CommandHandler prototype is cloned with the runtime state information, and it is passed back to the CommandServer 930. The CommandServer 710 gives the newly cloned CommandHandler 742 a reference and the same CommandResponse object provided in the first step 940. The CommandServer 710 then delegates execution of the CommandHandler 742 to the CommandDispatcher 770 by placing it in its Queue 772, 950. When ready, the CommandDispatcher 770 will grab a thread from the Queue 772, 960. The CommandDispatcher 770 will then call the CommandHandler run( ) method 970. Once running, the CommandHandler 742 can do whatever is required to satisfy the request, making use of system services of the CommandServer 710, 980. Once a result (or error) has been generated, the CommandHandler 742 places the value in setResult( ), loads its CommandResponse object setValue( ) with result, and the result passes back to the caller 990. FIG. 9B depicts a dataflow 902 of an XCL command process steps shown in FIG. 9A in a CommandServer architecture.

The SSE employs a Command Language based on XML, the Extensible Markup Language. This Command Language is called XCL. XCL commands are issued as XML documents and search results are returned as XML documents. The syntax of XCL consists of XML elements, their values and attributes, which control the behavior of the Similarity Search Engine Server. Using XCL commands, a client program can define and execute searches employing the SSE Server.

This description introduces the Application Programming Interface (API) for the SSE Server. All SSE commands are formed in XML and run through the execute interface, which is implemented for both Java and COM. For Java, there are synchronous and asynchronous versions. For COM, the interface is always synchronous. For both versions, there are similar methods. The first accepts a string and would be appropriate when the application does not make extensive use of XML, or when it wants to use the SAX parser for speed and does not employ an internal representation. The other method accepts a DOM instance and opens the door to more advanced XML technologies such as XSL.

Turning now to FIG. 10, FIG. 10 depicts the general XCL command format. Logically, XCL commands look like XML documents. Each command is a document and its clauses are elements. Command options are given by element or attribute values. The XCL command language provides three main types of commands for building similarity applications—a SCHEMA command that defines the document set for the similarity search, a QUERY command that searches the document set, and some administrative commands for managing documents, queries, measures, and so on. The SCHEMA command has three main clauses. A STRUCTURE clause describes the structure of the documents to be searched, arranging data elements into an XML hierarchy that expresses their relationships. A MAPPING clause maps search terms with target values from the datasources. A SEMANTICS clause indicates how similarity is to be assessed. The QUERY command also has several clauses. A WHERE clause indicates the structure and values for the search terms. A FROM clause describes the datasources to be accessed. SELECT and RESTRICT clauses describe the result set and scoring criteria. And an optional SEMANTICS clause overrides semantics defined in the SCHEMA. The administrative commands allow the application to read, write, and delete the documents, queries, schemas, measures, parsings, choices, and datatypes used in the search. For multi-user situations, a simple locking protocol is provided.

XCL commands return result sets in the form of XML documents. The QUERY command contains similarity scores for the documents searched. The result set can return scores for entire documents or for any elements and attributes they contain. In case of problems, the result set contains error or warning messages. Results can be returned synchronously or asynchronously. The synchronous calls block until the result set is ready, while the asynchronous calls return immediately with results returned via a callback coded in the client. Depending on the needs of the application, the results can be retrieved in either string or DOM format. The ResultSet class used by SSE Command Language mimics the ResultSet class for JDBC, allowing applications to iterate through the results to access their contents.

All XCL commands operate on XML documents and produce document sets as results. An XML document begins at a top node (the root element), and elements can be nested, forming a hierarchy. The bottom or "leaf" nodes contain the document's content (data values). A document set is a collection of documents with the same hierarchical layout, as defined by the schema for the search. An anchor document is a hierarchy of XML elements that represent the data values to be used as search criteria. Currently, there can be only one instance of each element in the anchor document. However, the target documents can have repeated groups.

Figure 11:
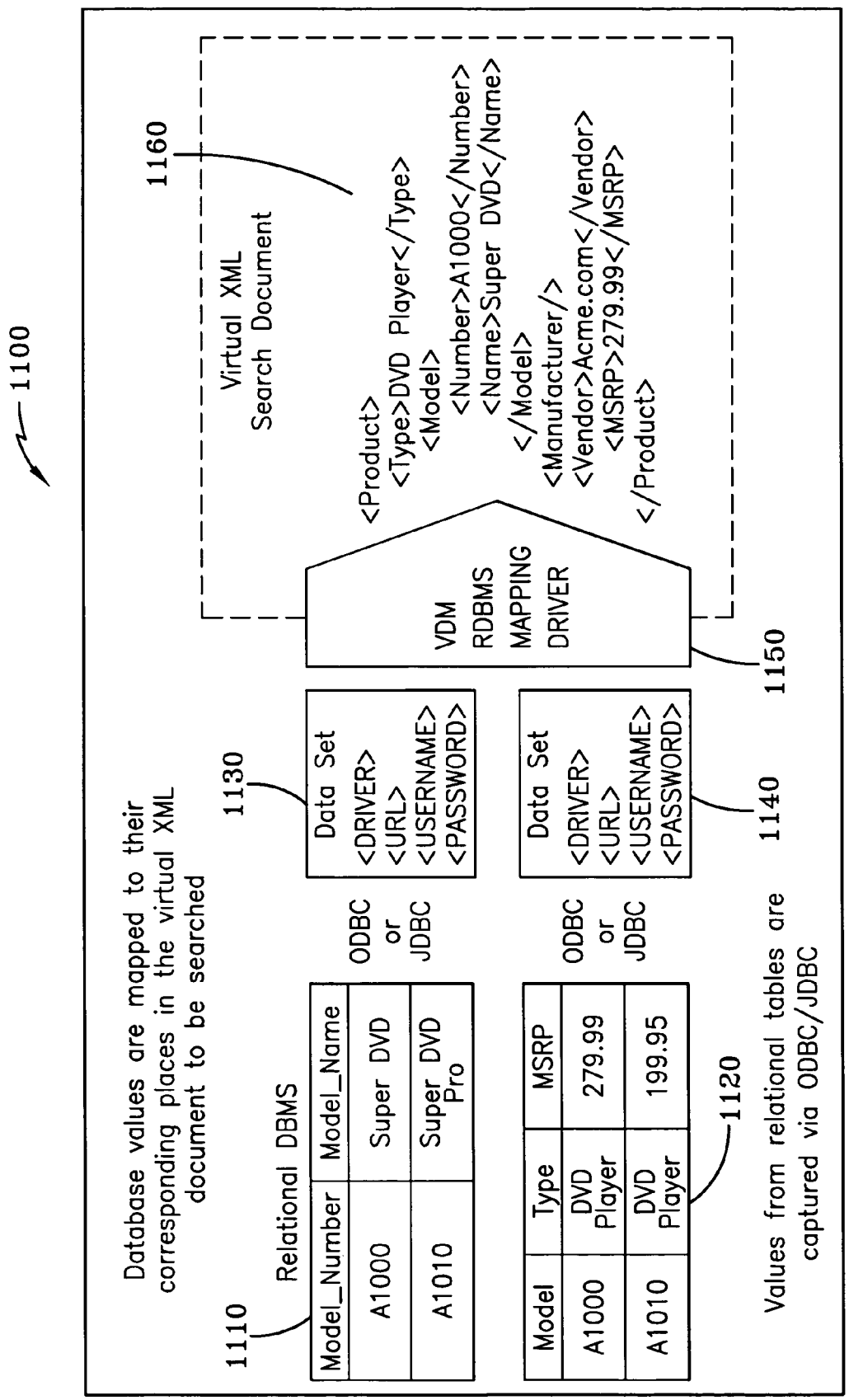
FIG. 11 depicts an example of multiple tables mapped onto a search document.

Turning now to FIG. 11, FIG. 11 depicts a hierarchical layout 1100 that allows multiple tables 1110, 1120 to be mapped onto the search document 1160 via datasets 1130, 1140 through the use of the VDM Relational Database Driver 1150 discussed above. The Database values are mapped to their corresponding places in the virtual XML document to be searched. A target document 1160 is a hierarchy of values drawn from a relational database 1110, 1120. Values from the Relational Database 1110, 1120 are captured via OBDC or JDBC. Target documents can span multiple tables, joined by master/detail fields. Documents examined by the SSE Server are virtual in the sense that they provide hierarchical representations that match the structure of the search schema while the data they contain still resides in the database tables 1110, 1120. In many cases, the target documents are a direct reflection of tables being tapped in the search. Each valued element corresponds to field (column) in a table, and group elements correspond to the tables themselves 1110, 1120. The hierarchical layout allows multiple tables 1110, 1120 to be mapped onto the virtual XML search document 1160, even tables from other databases in the case of a cross-database search. The relationship between the target documents and datasource is mapped as part of the schema defined for the search. A database can have many schemas, providing different ways of searching it.

Turning now to FIG. 12, FIG. 12 depicts the format of a SCHEMA command. The SCHEMA command enables a user to manage the schema for a search document, defining the hierarchical structure of the document and mapping its elements to data sources and similarity measures. A SCHEMA command for a search document comprises of its STRUCTURE clause, its MAPPING clause, and its SEMANTICS clause. The STRUCTURE clause defines the search terms and their relationships in XML format. The MAPPING clause defines the target values and where they reside. The SEMANTICS clause can include overrides to the default similarity measures, choices, and weights. Schemas can be listed, read, written, deleted, locked, and unlocked by the SCHEMA command, as required. Search schemas must be coded manually according to the syntax given here. Predefined datatypes provide shortcuts for those wishing to use standard domain-oriented elements and measures. Search schemas normally reside in an SSE schema repository. The "list" operator of the SCHEMA command returns a childless <SCHEMA> element for each schema in the repository. With a "read" operator, the SCHEMA command returns the schema indicated. Or if the schema name is given as "*", the "read" operator returns all schemas in the directory. The "write" operator causes the SCHEMA command to write the specified search schema into the directory, overwriting any existing schema with the same name. The "delete" operator purges the specified document. The "lock" and "unlock" operations provide a simple locking protocol to prevent conflicting updates in case several DOCUMENT operations are attempted at once by different clients. The operation attribute returns as "locked" or "denied" to indicate the success of the operation. For example, the command <SCHEMA op="list" name="*"/> calls for a list of schemas shown in FIG. 13.

Turning now to FIG. 14, FIG. 14 depicts the format for a STRUCTURE clause. The SSE Server uses the hierarchical structure of the XML anchor document to express definitions, options, and overrides throughout the XCL command language. The XML structure of the anchor document is defined in the STRUCTURE clause, specifying the data elements involved in the search along with their positions in the search document. The SEMANTICS clause refers to this structure in mapping these elements to information sources, similarity measures, and so on. A unique aspect of the XML hierarchy shown in the STRUCTURE clause is that no values are given. Elements that represent search terms are shown as empty—i.e., just the XML tag. The values are to be supplied by the associated datasources. In the case of a "flat" search, all the target values are for child elements belonging to the parent. In a "hierarchical" search, the search terms may occur at different levels of the hierarchy with multiple occurrences of values for child elements.

However, the anchor document cannot specify repeated values. FIG. 15 depicts an example of a STRUCTURE clause for a hierarchical search.

Turning now to FIG. 16, FIG. 16 depicts the format of the MAPPING clause, which associates elements in the anchor document with target fields in the database. The MAPPING clause governs the mapping between elements of the XML search document and the elements of a relational database. Its contents are: database name, location, driver, username, and password. When multiple databases are connected, the mapping also indicates the node in the search document schema to populate with data from the database. Each database table or view is represented by a dataset, which gives the bindings of database fields to elements and attributes in the search schema. Datasets bind with each other to join the database tables into a hierarchy that matches the structure of the search schema. The MAPPING clause for a relational datasource contains a <DATASET> element for every table in the database that contains target values for the search. <DATASET> contains the datasource attribute that identifies the object used as the datasource. The <DATASET> also contains an <EXPRESSION> element that tells SSE that the datasource is a relational table. The <DATASET> also includes a <PATH> element that indicates which element in the search schema contains the search terms for target values drawn from the table. Target values are mapped to the search schema with a <FIELD> element for each field to be included. The <DATASET> for a relational table also contains a <BIND> element that defines master/detail relationships with other tables. This binding resembles a JOIN operation by the DBMS, associating a foreign key in the detail table with a primary key in the master table. FIG. 17 depicts an example of a MAPPING clause. For example the <MAPPING> may include two <DATASET> elements, the first to describe the master Product table, and the second to describe the detail Model table.

Turning now to FIG. 18, FIG. 18 depicts the format of the SEMANTICS clause, which assigns measures, choices, and weights to search terms. The SEMANTICS clause provides intelligence to guide the search. By default, standard measures based on datasource datatypes are assigned to the search terms. Sometimes these provide adequate results, but other times applications require measures that take into account the way the data is used. New semantics are assigned with the APPLY clause, which consists of a repeatable PATH clause and up to one each of the following: MEASURE clause, CHOICE clause, and WEIGHT clause. The PATH clause indicates an element in the search schema that is to receive new semantics. The xpath notation traces a hierarchical path to the element beginning at the root. When several elements are to receive the same semantics, they can be listed in the same <APPLY> clause. The MEASURE clause allows the use of refined measures for the elements indicated in the APPLY clause. For those elements, the measure specified in the MEASURE clause takes precedence over any measure specified in the original schema. The specified measure can either be a variation on the standard measure, a new measure defined using the SSE syntax, or a user-coded measure. The CHOICE clause enables a different pairing algorithm to be assigned to parsed values of the elements indicated in the APPLY clause. These algorithms perform aggregation of the similarity search scores of the attributes determined by the measure algorithms. The WEIGHT clause allows a relative weight to be assigned to the scores of the elements listed in the APPLY clause. By default, all elements and attributes belonging to the same parent are assigned equal weights. That is, the scores of the child elements and attributes are averaged to produce the score for the parent. If necessary, the scores are normalized to produce an overall score in the range 0.00 to 1.00. For example, in scoring a name, <LAST> might be assigned a WEIGHT of 0.70, <MIDDLE> a WEIGHT of 0.10, and <FIRST> a WEIGHT of 0.20. The resulting score for would then be calculated as:

$$score=(0.70)*(score<LAST>)+(0.10)*(score<MIDDLE>)+(0.20)*(score<FIRST>).$$

Without the WEIGHT clause, the calculation would be:

$$score=(score<LAST>+score<MIDDLE>+score<FIRST>)/3.$$

Figure 19:
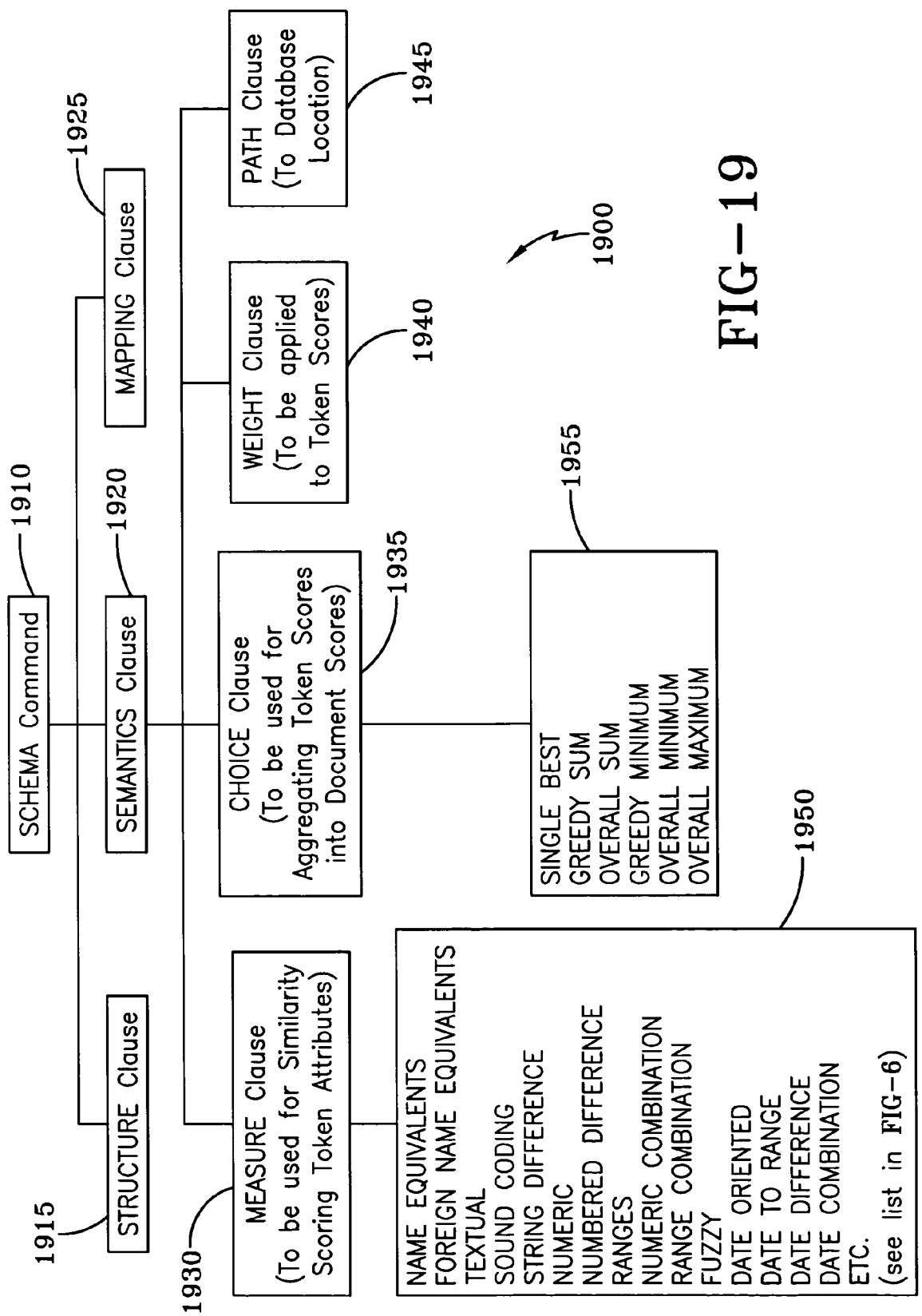
FIG. 19 depicts the structure of a SCHEMA command and it related clauses.

Turning to FIG. 19, FIG. 19 depicts the hierarchical structure 1900 of the SCHEMA command 1910. As described above, the SCHEMA command 1910 comprises a STRUCTURE clause 1915, a SEMANTICS clause 1920 and a MAPPING clause 1925. The SEMANTICS clause 1920 comprises a MEASURE clause 1930 for identifying Measures 1950 to be used for scoring document attribute tokens, a CHOICE clause 1935 for identifying the Aggregation algorithms 1955 for "rolling up" token scores to obtain document scores, a WEIGHTING clause 1940 for emphasizing or de-emphasizing token scores, and a PATH clause 1945 for indicating a path to an element of a search schema in a RDMS to which the SEMANTICS clause 1920 will apply. The MEASURE clause 1930 contains a partial list of MEASURES algorithms 1950 for determining token attribute scores. FIG. 6 above describes a more detailed list of MEASURE algorithms. The CHOICE clause 1935 contains a partial list of CHOICE algorithms 1955 for aggregating token scores into document scores.

Turning now to FIG. 20, Figure depicts the format of the QUERY command. The QUERY command initiates a similarity search, which scores matches between search terms indicated in a WHERE clause and target values drawn from the relational datasource indicated in the FROM clause. The RESTRICT clause and SELECT clause determine what results are returned. The QUERY command looks to the search schema for the structure and semantics of the search, or to subordinate SEMANTICS clauses that override the default settings in the schema document.

The format of the WHERE clause is shown in FIG. 20. The WHERE clause indicates the anchor to be compared to target values drawn from the datasources specified in the FROM clause. The anchor document is structured as a hierarchy to indicate parent/child relationships, reflecting the STRUCTURE clause of the search schema. For the SSE Server, the WHERE clause takes the form of an XML document structure populated with anchor values, i.e. the values that represent the "ideal" for the search. This document's structure conforms to the structure of the search schema. However, only the elements contributing to the similarity need to be included. Hierarchical relationships among elements, which would be established with JOIN operations in SQL, are represented in SSE Command Language by the nesting of elements in the WHERE clause. No matter where they occur in the document structure, all elements included in the WHERE clause are scored against the target values drawn from the associated datasource. Unlike its SQL counterpart, the SSE Server's WHERE clause does not always qualify or select a collection of records for further processing. In a similarity search, every target value receives a score. The results returned to the application client can be controlled with RESTRICT and SELECT clauses, but the similarity search looks at every document. The SSE's WHERE clause tells the SSE Server which elements and attributes to score. A more direct comparison in SQL might be the list of data items in the main clause of the command. FIG. 21 depicts an example of the WHERE clause. A WHERE clause is required in any QUERY that does similarity scoring. Without a WHERE clause, a QUERY can still return documents according the SELECT clause.

The format of the FROM clause is shown in FIG. 20. The FROM clause associates the QUERY with the document set being searched. The FROM clause identifies the set of documents to be examined in the search. These are virtual documents drawn from relational datasources according to a predefined mapping. The FROM clause offers two ways to identify search documents. The first draws target values from a relational datasource through the VDM. The second presents the documents themselves as part of the FROM clause. FIG. 22A depicts examples of a FROM clause that indicates the search should examine the entire set for "acme-_products". FIG. 22B depicts an example of a FROM clause that indicates the search should examine the documents shown.

Turning now to FIG. 23, FIG. 23 depicts the format of the RESTRICT clause. The RESTRICT clause places limits on the results returned by the QUERY. The RESTRICT clause offers three methods for culling the results of a QUERY before they are returned to the client. When a RESTRICT clause contains multiple methods, they are applied in the order listed, each working on the result of the one before it. The SCORE clause includes <START> and <END> elements (both required, neither repeating) to define the range of scores for documents to be returned. If the <START> score is greater than the <END> score, the documents receiving scores in that range are returned in descending order by score. That is, the score closest to 1.00 comes first. When the <END> score is the larger, the results are in ascending order. The INDEX clause includes <START> and <END> elements (both required, neither repeating) to define a sequence of documents to return. For this purpose, candidate documents are numbered sequentially and the documents with sequence numbers falling in the range between <START> and <END> are returned. This is useful for clients that need a fixed number of documents returned. The sequence numbers must be positive integers. FIG. 24 depicts an example of the RESTRICT clause. This RESTRICT clause first limits the scores to those over 0.80. Then it returns the first three. If there are not at least three remaining, it returns what's left.

The format of the SELECT clause is shown in FIG. 19. The SELECT clause allows the application to determine the structure of the result set. Otherwise, the results consist of a list of all documents examined with a similarity score for each document. The SELECT clause governs the contents of the result set returned to the client. By default, the client receives a list of DOCUMENT elements, each with a score that indicates its degree of similarity to the search terms in the QUERY. The score is reported as an added attribute for the <DOCUMENT> element, along with its name and schema. If the boolean for scoring is set to false, only the document name and schema are returned. Likewise, if the QUERY does not include a WHERE clause, no scoring is performed. A SELECT clause that includes a structure from the search schema returns <DOCUMENT> elements containing that structure, each with the target value considered in the search. If the boolean for scoring is set to true (default), the result set includes <DETAIL> elements that contain a <PATH> element structure given in the WHERE clause and a <SCORE> element with the similarity score. FIG. 25 depicts an example of a SELECT clause that returns both target values and similarity scores.

The QUERY command also contains a SEMANTICS clause, as shown in FIG. 20. The SEMANTICS clause in a QUERY command has the same format as a SEMANTICS clause in a SCHEMA command, and is discussed above in the description of FIG. 18 and FIG. 19. A SEMANTICS clause specifies the semantics to use in the QUERY, and will override the default SEMANTICS clause contained in the SCHEMA command. For details on the MEASURE clause, CHOICE clause, and WEIGHT clause and PATH clause comprising a SEMANTICS clause, refer to their descriptions above in FIG. 18 and FIG. 19 relative to the SCHEMA command.

For traditional exact-match searches, results are just a list of the documents that satisfy the search's matching criteria. However, similarity searches normally regard all documents as similar to some degree, so the result of a similarity search is a list of all the documents searched, each with a similarity score that tells how similar it is to the search criteria. Optionally, the client can limit the result set to documents with a specified degree of similarity—for example a score of 90% or above—according to the requirements of the application. The client may also request details showing the anchor and target values that were compared to produce the document score.

Turning now to FIG. 26, FIG. 26A depicts the format of a RESPONSE structure. A successful QUERY command returns a <RESULT> element whose contents are determined by the SELECT clause as just described above. An unsuccessful QUERY may return an <ERROR> or <WARNING> to the client. A RESPONSE format showing only scores of a similarity search is depicted in FIG. 26B, and a RESPONSE format showing details of a similarity search is depicted in FIG. 26C. Commands other than a QUERY command return results, but not similarity scores. For these other commands, <RESULT> contains an element that echoes the original command and contains set of elements of the type requested. A "list" operation produces a set of childless elements of the type requested, each with an identifying name attribute. A "read" operation returns complete XML structures for the elements requested. The <DETAIL> element depicted in FIG. 26C is included when the score attribute of a QUERY command SELECT clause is set to "true". This produces a list of elements and attributes used in the WHERE clause of the QUERY command and the target values used to produce the scores. Each score is reported in a <SCORE> element of an APPLY clause along with a <WHERE> element with the xpath of the search term and a <FROM> element with the xpath of the target value. When multiple target values are involved, the xpath includes an index to indicate which one was chosen for scoring, e.g. the third value (in tree order) for a product's model number would be Product/Model/Number. In addition to the name attribute, which indicates which result document the details concern, the <DETAIL> element preserves any attributes from the original command. When the DETAIL concerns an unnamed document, such as the result of an embedded QUERY, an index attribute is added and its value indicates the document's sequence number among others in the set. FIG. 27 shows an example of a RESPONSE with results of a similarity search containing scores for three documents, where document's score is based on comparing its values with the search terms, a unique name identifies the document, and a search schema used in the command.

Turning now to FIG. 28, FIG. 28 depicts the format of a DOCUMENT command. The DOCUMENT command enables the application to manage document sets involved in the search. The DOCUMENT command includes operations for managing the document set used in the search. The "list" operation returns a childless <DOCUMENT> element for each document in the set. The "read" operation retrieves documents from the datasource according to the mapping defined in the schema. The "lock" and "unlock" operations provide a simple locking protocol to prevent conflicting updates in case several DOCUMENT operations are attempted at once by different clients. The operation attribute returns as "locked" or "denied" to indicate the success of the operation. When "*" is specified instead of the document name, the "read" operation returns all documents. Likewise, the "*" tells the "delete", "lock", "unlock", and "index" operations to affect all documents in the set. Currently, the "list" operation requires name="*" and returns only the first 100 documents. Search documents need an identifier to serve as the primary key. The document name can be anything as long as it is unique within the set. Where documents are drawn from relational datasources, it is customary to use the primary key for the root table as the document name. FIG. 29 depicts an example of a search document representative of the search document depicted in FIG. 11 above. To carry out a search of this document, the structure would be populated with the values used in the search to form the anchor document. The same structure is used to return the results of a search, including the documents found to be similar to the search criteria, in addition to the scores indicating the degree of similarity for each document.

Figures 32, 33, 34:
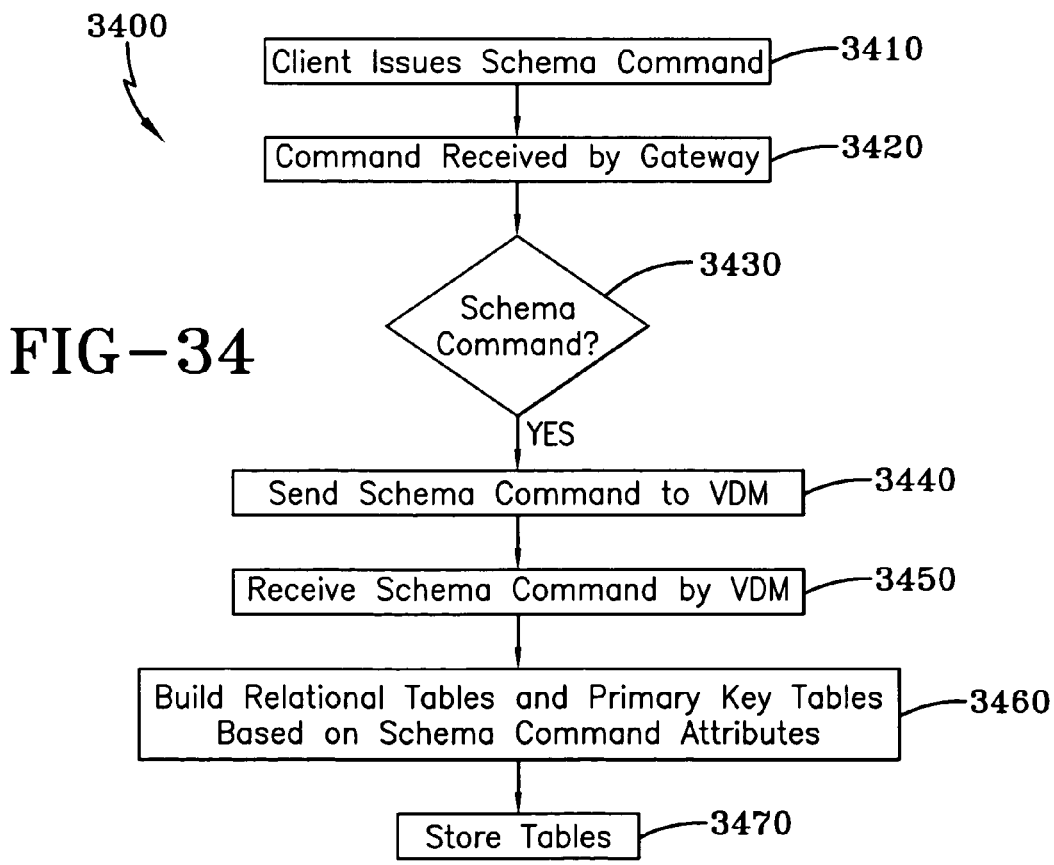
FIG. 32 depicts a RESPONSE to a statistics generation command.
FIG. 33 depicts the format of a BATCH command.
FIG. 34 depicts the process of setting up a schema.

Turning now to FIG. 30, FIG. 30 depicts a format of a STATISTICS command definition template, where bold italic represents optional sections. The Statistics Processing Module (SPM), discussed above in regard to FIG. 5 uses this definition template. FIG. 31 is an example of a simple STATISTICS definition. The FROM clause identifies a document Schema and the SELECT clause identifies a last, first and middle name of a claimant. FIG. 32 depicts a SCHEMA response to a STATISTICS generation command.

Turning now to FIG. 33, FIG. 33 depicts the format of a BATCH command. BATCH commands provide a way to collect the results of several related operations into a single XML element. Each command in the batch is executed in sequence.

There are additional commands that are used for administrative and maintenance purposes. The DATASOURCE command is used for identifying and maintaining datasources in the Relational Database Management System (RDMS). The MEASURE command is used for creating and maintaining the measures for determining document attribute and token similarity scores stored in the RDMS as User Defined Functions (UDFs). The CHOICE command is used for creating and maintaining aggregation (roll-up) algorithms stored in the RDMS and used by the Search Manager for determining overall document similarity scores.

Turning now to FIG. 34, FIG. 34 depicts the overall process of setting up a schema. Prior to beginning this process, a target database must be imported into the Relational Database Management System associated with the SSE Server, as shown in FIG. 1. In addition, the user must have knowledge of the structure of the data within the imported database. The structure knowledge is required for the user to set up a schema. With reference to FIG. 1, the VDM synthesizes XML documents from relational data, and the SM synthesizes relational data from XML documents. Referring to FIG. 34, a schema must be established 3400 by the Client sending 3410 and the Gateway receiving 3420 a command. The command is transmitted to the SSE Server from the Client using sockets, HTTP or JMS protocol. The command is converted to XCL by the Gateway and it is determined if it is a SCHEMA command. FIG. 35 depicts an example of a SCHEMA command based on the format shown in FIG. 12. Turning back to FIG. 34, after a client issues a Schema command 3410 and the command is received by the Gateway 3420, the Gateway determines that the command is a Schema command 3430. Since this is a SCHEMA command, the Gateway sends the SCHEMA command to the VDM 3440. When the Schema command is received by the VDM 3450, the VDM builds relational tables and primary key tables based on the Schema command attributes 3460. These tables are then stored for future use 3470.

Figure 36A:
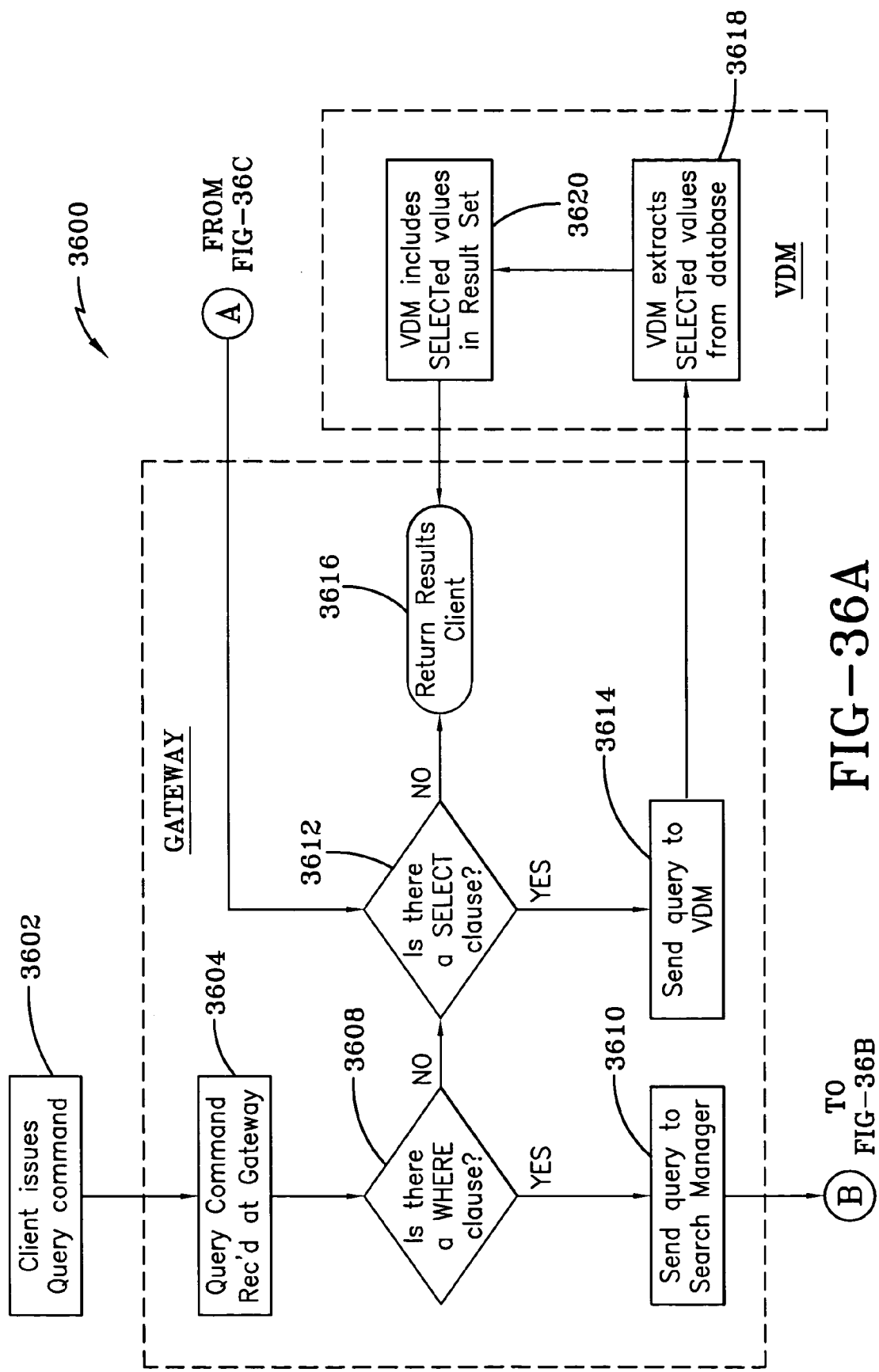
FIG. 36 depicts the process of executing an SSE search.

Turning now to FIG. 36, FIGS. 36A, 36B, and 36C depicts the overall process of executing a SSE search. After one or more schemas have been defined, the SSE is ready to accept a QUERY command. A typical QUERY command based on the format shown in FIG. 19 might resemble the example QUERY command shown in FIG. 37. Turning now to FIG. 36A, when a client issues a QUERY command 3602 that is received by the Gateway 3604, it is determined if there is a WHERE clause in the command 3608. If there were no WHERE clause in a QUERY command 3608, the command would be examined to determine if there was a SELECT clause in the QUERY command 3612. If there were no SELECT clause 3612, RESULT would be returned to the client 3616. If there were a SELECT clause in the Query command 3612, indicating a selection of the structure for the result set to be produced by the QUERY command, the QUERY command would be sent to the VDM 3614. Upon receipt of the QUERY command by the VDM, the VDM extracts the SELECTed values from the RDMS 3618 and includes the SELECTed values in a RESULT set 3620, which is returned to the client 3616. If there were a WHERE clause in a QUERY command 3608, the QUERY command would be sent to the SM 3610.

Figure 36B:
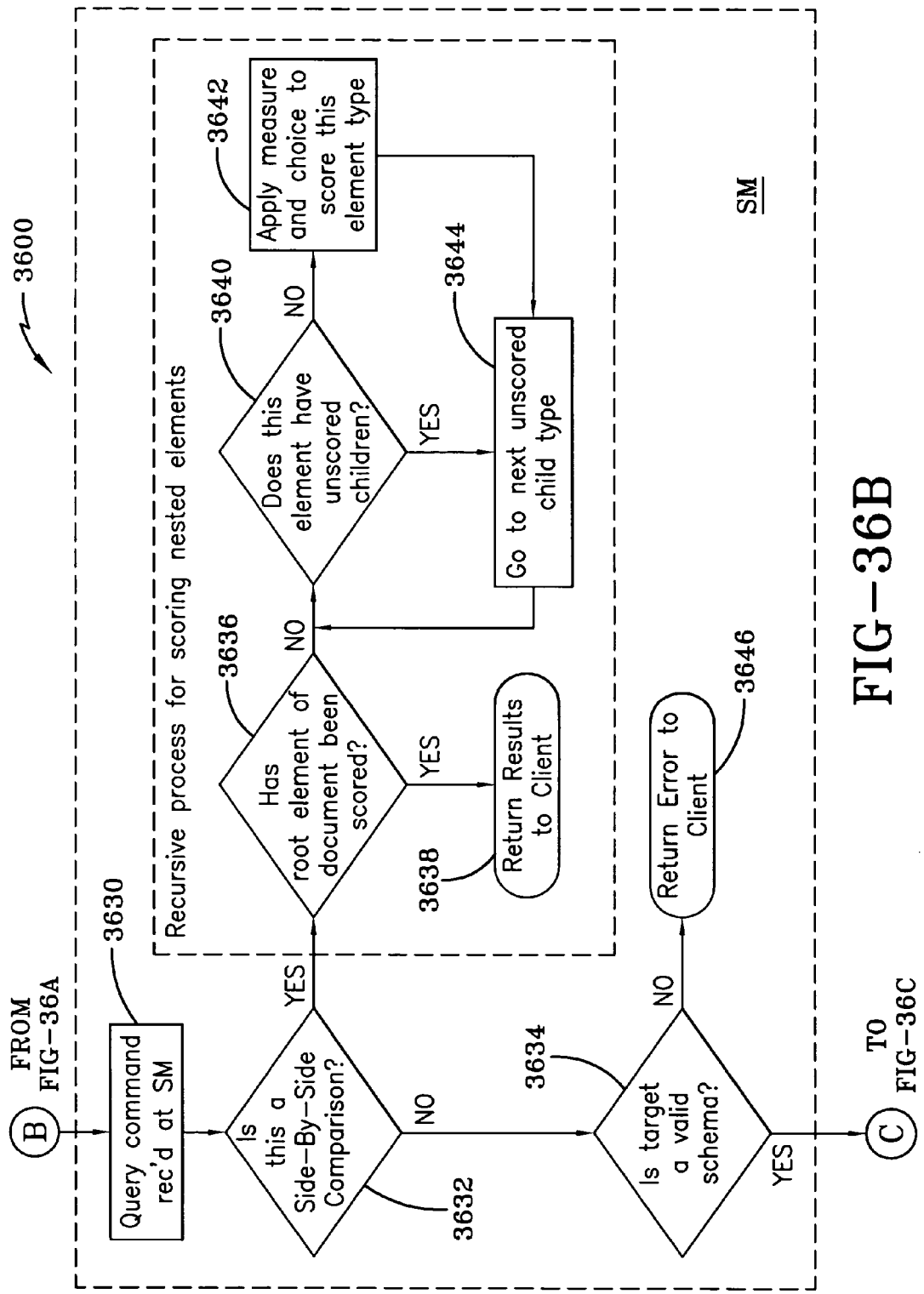

Turning now to FIG. 36B, the QUERY command is received at the SM 3630. It is then determined if the QUERY command is a side-by-side comparison 3632. If it is a side-by-side comparison 3632, a recursive process for scoring nested elements is initiated. If it is not a side-by-side comparison 3632, it is determined if the target is a valid schema 3634. If it is not a valid schema 3634, an error condition is returned to the client as a RESULT 3646. Otherwise, the process moves to a determination of a REPEATING GROUP query 3660 in FIG. 36C. The recursive process for scoring nested elements that is entered if the Query requires a side-by-side comparison 3632 comprises determining if a root element of a document has been scored 3636. If it has, RESULT is returned to the client 3638, otherwise it is determined if the element has unscored children 3640. If the root element has unscored children 3640, the next unscored child type is examined 3644 and it is determined if this element has unscored children 3640. If this element does not have unscored children 3640, MEASURE and CHOICE are applied to this element type 3642, and the next unscored child type is examined 3644. This process continues until the root element of the document has been scored 3636 and RESULT returned to the client.

Figure 36C:
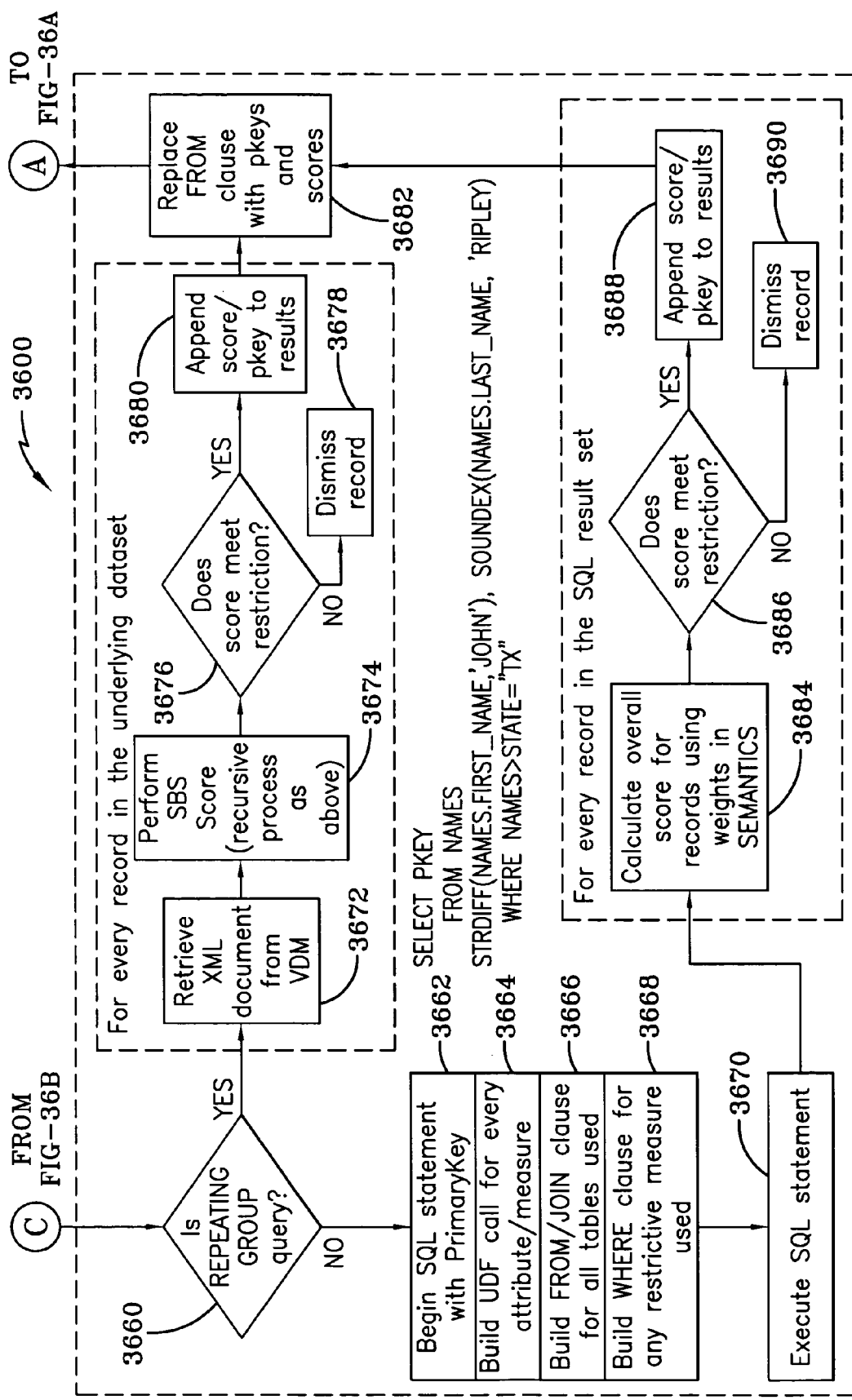

Turning now to FIG. 36C, if a target is a valid schema 3634 from FIG. 36B, a determination is made of whether the QUERY is a REPEATING GROUP query 3660. If it is a REPEATING GROUP query 3660, a score and primary key is determined for every record in the underlying dataset. If it is not a REPEATING DATASET 3660, the process continues by beginning a SQL statement with primary key 3662, building a UDF call for every attribute and measure 3664, building FROM/JOIN clauses for all tables used 3666, building WHERE clauses for any restrictive measure used 3668, and executing the SQL statement 3670. Next, for every record in the SQL result set, overall score for records using weights in SEMANTICS is calculated 3684, dismissing a record 3690 if the score does not meet restriction 3686, and appending score/pkey to results 3688 if the score does meet restriction 3686. The pkeys and scores replace FROM clause 3682 and control is returned to the Gateway to determine if there is a SELECT clause 3612, and processed as described above in FIG. 36A. If the QUERY is a REPEATING GROUP query 3660, a score and primary key is determined for every record in the underlying dataset. This process comprises retrieving an XML document from the VDM 3672 and performing a side-by-side scoring 3674 using the recursive process for scoring nested elements describe above including steps 3636, 3638, 3640, 3642 and 3644. A record is dismissed 3678 if the score does not meet restriction 3676, and appending score/pkey to results 3680 if the score does meet restriction 3666. The pkeys and scores replace FROM clause 3682 and control is returned to the Gateway to determine if there is a SELECT clause 3612, and processed as described above in FIG. 36A.

An SQL command from the example SCHEMA and QUERY commands shown above may be as follows:

SELECT PKEY STRDIFF(PERSONS.FIRST."JOE"), STRDIFF(PERSON.LAST.SMITH)

Turning now to FIG. 38, FIG. 38 depicts an example data table in the RDMS and associated RESULT from the example SQL command above. FIG. 39 depicts the result of the Query command described above that would be returned to the client as a RESULT within a RESPONSE. This RESPONSE corresponds to the results illustrated in FIG. 38.

Although the present invention has been described in detail with reference to certain preferred embodiments, it should be apparent that modifications and adaptations to those embodiments might occur to persons skilled in the art without departing from the spirit and scope of the present invention.

What is claimed is:

1. A software system implemented by instructions in a computer system for performing similarity searching, comprising:
   a gateway that handles all communication between a client and the software system, between the gateway and a virtual document manager and between the gateway and a search manager;
   the virtual document manager connected between the gateway and a relational database management system that receives command from the gateway and provides schema and document management;
   the search manager connected between the gateway and the relational database management system that receives commands from the gateway, initiates attribute token similarity searches in the relational database management system using prestored attribute token similarity measure algorithms, receives attribute token similarity search results from the relational database management system, aggregates the attribute token similarity search results into document similarity search results sets, and forwards the document similarity search result sets to the gateway;
   the relational database management system that provides relational data management, document and attribute token similarity measure algorithm persistence, and attribute token similarity measure algorithm execution; and
   the gateway that sends documents from the virtual document manager and document similarity search result sets from the search manager to the client.

2. The system of claim 1, wherein the virtual document manager includes a relational database driver for mapping XML documents to relational database tables.

3. The system of claim 1, wherein the virtual document manager includes a statistics processing module for generating statistics based on similarity search results.

4. The system of claim 1, wherein the relational database management system includes means for storing and executing user defined functions.

5. The system of claim 4, wherein the user defined functions include measurement algorithms for determining attribute token similarity scores.

6. A software method implemented by instructions in a computer system for performing similarity searching, comprising the steps of:
   receiving a request by a gateway from a client for initiating a similarity search:
   creating a search schema document by a virtual document manager;
   generating one or more query commands by the gateway;
   executing one or more query commands in a search manager that causes a relational database management system to perform attribute token similarity searches;
   determining the degree of similarity between an anchor document and search documents by the search manager that aggregates attribute token similarity search scores from the relational database management system; and assembles document similarity search result sets containing document similarity scores of between 0.00 and 1.00; and
   sending the similarity search sets to the client by the gateway.

7. The method of claim 6, wherein the step of creating a schema document comprises;
   designating a structure of search documents;
   designating datasets for mapping search document attributes to relational database locations; and designating semantics identifying measures for computing token attribute similarity search scores between search documents and an anchor document, weights for modulating token attribute similarity search scores, choices for aggregating token attribute similarity search scores into document similarity search scores, and paths to the search document structure attributes.

8. The method of claim 6, wherein the step of generating one or more query commands comprises designating an anchor document, search or schema documents, restrictions on result sets, stnicture of result sets, and semantics for overriding schema document semantics including measures, weights, choices and paths.

9. The method of claim 6, wherein the step of executing one or mare query commands comprises:
   computing token attribute similarity search scores having values of between 0.00 and 1.00 for each search document and an anchor document in a relational database management system using measure algorithms; and modulating the token attribute similarity search scores using weights and aggregating the token attribute similarity scores into document similarity scores having values of between 0.00 and 1.00 in the search manager using choice algorithms.

10. The method of claim 6, wherein the step of assembling a result document comprises identifying associated query commands and schema documents, document structure, paths to search terms, and similarity scores by the search manager.

11. The method of claim 6, wherein the search schema, the query commands, the search documents, the anchor document and the result document are represented by hierarchical XML documents.

12. The method of claim 7, further comprising selecting measure algorithms from the group consisting of name equivalents, foreign name equivalents, textual, sound coding, string difference, numeric, numbered difference, ranges, numeric combinations, range combinations, fuzzy, date oriented, date to range, date difference, and date combination.

13. The method of claim 7, further comprising selecting choice algorithms from the group consisting of single best greedy sum, overall sum, greedy minimum, overall minimum, and overall maximum.

14. A computer-readable medium containing instructions for controlling a computer system to implement the method of claim 6.

* * * * *